(12) United States Patent
Hasegawa

(10) Patent No.: US 11,347,455 B2
(45) Date of Patent: May 31, 2022

(54) INFORMATION PROCESSING DEVICE, CONTROL METHOD FOR INFORMATION PROCESSING DEVICE, AND PROGRAM

(71) Applicant: SEIKO EPSON CORPORATION, Tokyo (JP)

(72) Inventor: Jin Hasegawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/131,093

(22) Filed: Dec. 22, 2020

(65) Prior Publication Data

US 2021/0200482 A1 Jul. 1, 2021

(30) Foreign Application Priority Data

Dec. 26, 2019 (JP) .............................. JP2019-235889

(51) Int. Cl.
*G06F 3/12* (2006.01)
(52) U.S. Cl.
CPC ............ *G06F 3/125* (2013.01); *G06F 3/1204* (2013.01); *G06F 3/1256* (2013.01)
(58) Field of Classification Search
CPC combination set(s) only.
See application file for complete search history.

(56) References Cited

U.S. PATENT DOCUMENTS

| 7,684,620 B2* | 3/2010 | Megawa | H04N 1/3872 382/176 |
| 8,700,442 B2* | 4/2014 | Takaoka | H04N 1/00501 705/7.27 |
| 2002/0113234 A1* | 8/2002 | Okuda | G01N 21/9501 257/48 |
| 2010/0245864 A1* | 9/2010 | Nara | H04N 1/58 358/1.9 |
| 2011/0075220 A1* | 3/2011 | Chiba | H04N 1/00331 358/2.1 |

(Continued)

FOREIGN PATENT DOCUMENTS

JP 2005182267 A 7/2005

*Primary Examiner* — Helen Zong
(74) *Attorney, Agent, or Firm* — Chip Law Group

(57) ABSTRACT

An information processing device includes: a split printing information setting unit setting split printing information, the split printing information including split position information about a split position in an original image when splitting the original image into a plurality of sub-images and printing the sub-images and overlap area information about an overlap area between the sub-images when pasting together the plurality of sub-images that are printed; and an instruction document preview generation unit generating an instruction document preview based on the split printing information, the instruction document preview being a print preview of a work execution instruction document for pasting together the plurality of sub-images that are printed. The instruction document preview generation unit generates the instruction document preview in such a way that the original image and a work execution image are displayed, the work execution image including a split position image showing the split position in the original image and an overlap area image showing the overlap area.

12 Claims, 21 Drawing Sheets

(56) References Cited

U.S. PATENT DOCUMENTS

| | | | |
|---|---|---|---|
| 2012/0050804 A1* | 3/2012 | Ohara | G06F 3/1292 358/1.15 |
| 2019/0354322 A1* | 11/2019 | Fineberg | G06F 3/1253 |
| 2019/0361646 A1* | 11/2019 | Hori | G06F 3/1241 |
| 2019/0361649 A1* | 11/2019 | Hori | G06F 3/1206 |

* cited by examiner

| | 47 |
|---|---|
| SPLIT PRINTING INFORMATION | |
| SPLIT POSITION INFORMATION | SPLIT INTO 4 IN 2 ROWS BY 2 COLUMNS<br>· 1 ROW BY 1 COLUMN:1180x840mm<br>⋮ |
| OVERLAP AREA INFORMATION | PASTE MARGIN:RIGHT<br>PASTE MARGIN WIDTH:10mm |
| PASTE MARGIN LINE PRINTING INFORMATION | YES |
| PASTE MARGIN LINE INFORMATION | POSITION:X=1188mm<br>THICKNESS:0.5pt<br>COLOR:BLACK<br>TYPE:SOLID LINE |
| COMMENT INFORMATION | NO |

FIG. 14

| INSTRUCTION DOCUMENT INFORMATION | |
|---|---|
| SPLIT POSITION INFORMATION | SPLIT INTO 4 IN 2 ROWS BY 2 COLUMNS<br>• 1 ROW BY 1 COLUMN:1188x840mm<br>⋮ |
| OVERLAP AREA INFORMATION | PASTE MARGIN:RIGHT<br>PASTE MARGIN WIDTH:10mm |
| PASTE MARGIN LINE PRINTING INFORMATION | YES |
| PASTE MARGIN LINE INFORMATION | POSITION:X=1188mm<br>THICKNESS:0.5pt<br>COLOR:BLACK (100%)<br>TYPE:SOLID LINE |
| COMMENT INFORMATION | • ①: x=600mm, y=400mm, BLUE<br>• ②: x=600mm, y=1240mm, BLUE<br>⋮ |

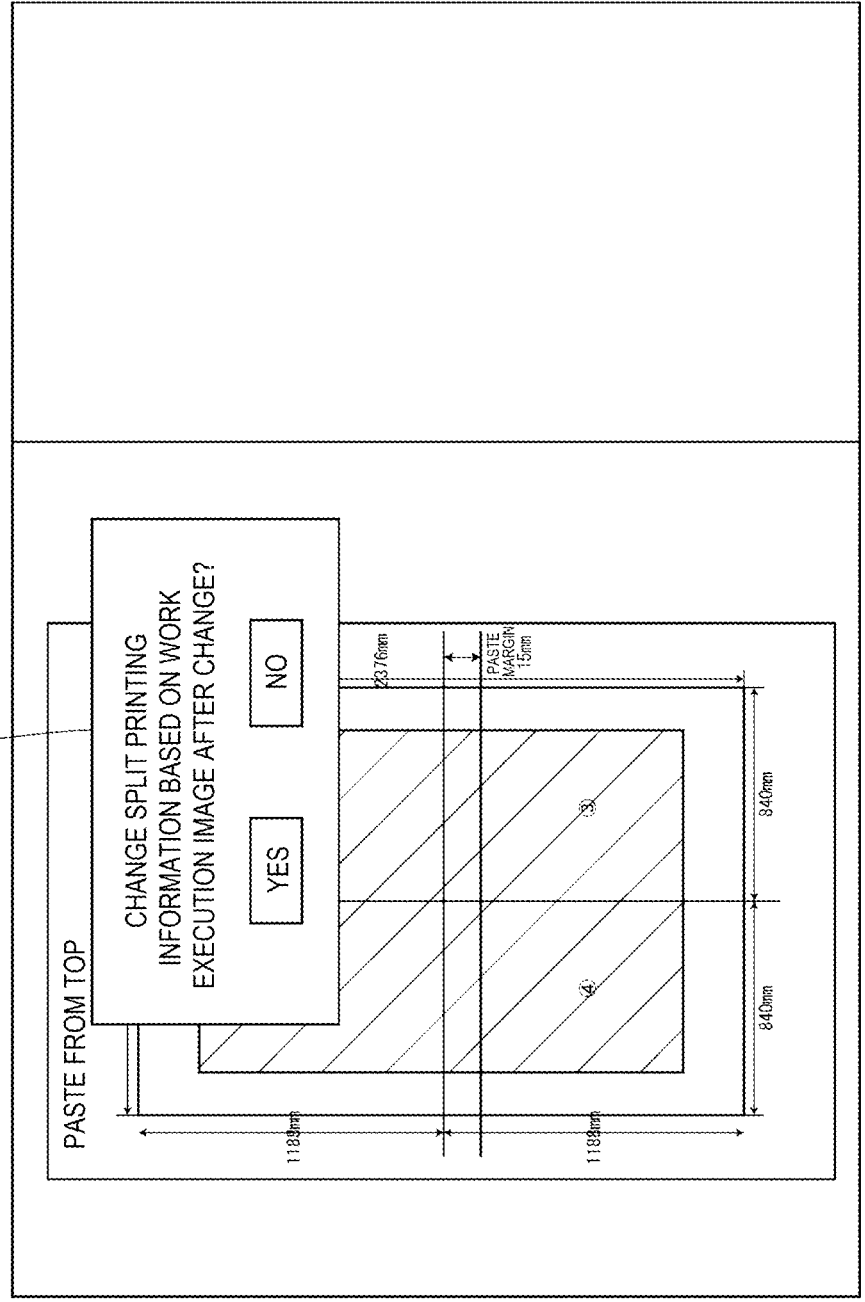

INFORMATION PROCESSING DEVICE, CONTROL METHOD FOR INFORMATION PROCESSING DEVICE, AND PROGRAM

The present application is based on, and claims priority from JP Application Serial Number 2019-235889, filed Dec. 26, 2019, the disclosure of which is hereby incorporated by reference herein in its entirety.

BACKGROUND

1. Technical Field

The present disclosure relates to an information processing device, a control method for an information processing device, and a program.

2. Related Art

A printing control device that generates a sketch for pasting together a plurality of sub-images split from an original image is known, as disclosed in JP-A-2005-182267. This printing control device prints a sketch provided with a demarcation line or a space between sub-images as a split position image showing a split position in the original image, based on origin information about logical coordinates serving as a reference for split printing.

The related-art printing control device sets split printing information for printing a plurality of sub-images and thus can display a split position image in a preview of a sketch but cannot display an overlap area image showing an overlap area between sub-images.

SUMMARY

An information processing device according to an aspect of the present disclosure includes: a split printing information setting unit setting split printing information, the split printing information including split position information about a split position in an original image when splitting the original image into a plurality of sub-images and printing the sub-images and overlap area information about an overlap area between the sub-images when pasting together the plurality of sub-images that are printed; and an instruction document preview generation unit generating an instruction document preview based on the split printing information, the instruction document preview being a print preview of a work execution instruction document for pasting together the plurality of sub-images that are printed. The instruction document preview generation unit generates the instruction document preview in such a way that the original image and a work execution image are displayed, the work execution image including a split position image showing the split position in the original image and an overlap area image showing the overlap area.

A control method for an information processing device according to another aspect of the present disclosure includes: setting split printing information including split position information about a split position in an original image when splitting the original image into a plurality of sub-images and printing the sub-images and overlap area information about an overlap area between the sub-images when pasting together the plurality of sub-images that are printed; and generating an instruction document preview based on the split printing information, the instruction document preview being a print preview of a work execution instruction document for pasting together the plurality of sub-images that are printed. The generating the instruction document preview generates the instruction document preview in such a way that the original image and a work execution image are displayed, the work execution image including a split position image showing the split position in the original image and an overlap area image showing the overlap area.

A non-transitory computer-readable storage medium according to still another aspect of the present disclosure stores a program. The program causes a processor provided in an information processing device to execute: setting split printing information including split position information about a split position in an original image when splitting the original image into a plurality of sub-images and printing the sub-images and overlap area information about an overlap area between the sub-images when pasting together the plurality of sub-images that are printed; and generating an instruction document preview based on the split printing information, the instruction document preview being a print preview of a work execution instruction document for pasting together the plurality of sub-images that are printed. The generating the instruction document preview generates the instruction document preview in such a way that the original image and a work execution image are displayed, the work execution image including a split position image showing the split position in the original image and an overlap area image showing the overlap area.

BRIEF DESCRIPTION OF THE DRAWINGS

FIG. 9 shows a split printing information setting menu and a split setting preview.

FIG. 10 shows split printing information.

FIG. 14 shows instruction document information.

FIG. 15 shows a confirmation window.

DESCRIPTION OF EXEMPLARY EMBODIMENTS

An embodiment of an information processing device, a control method for an information processing device, and a program will now be described with reference to the accompanying drawings.

Printing System

Figure 1:
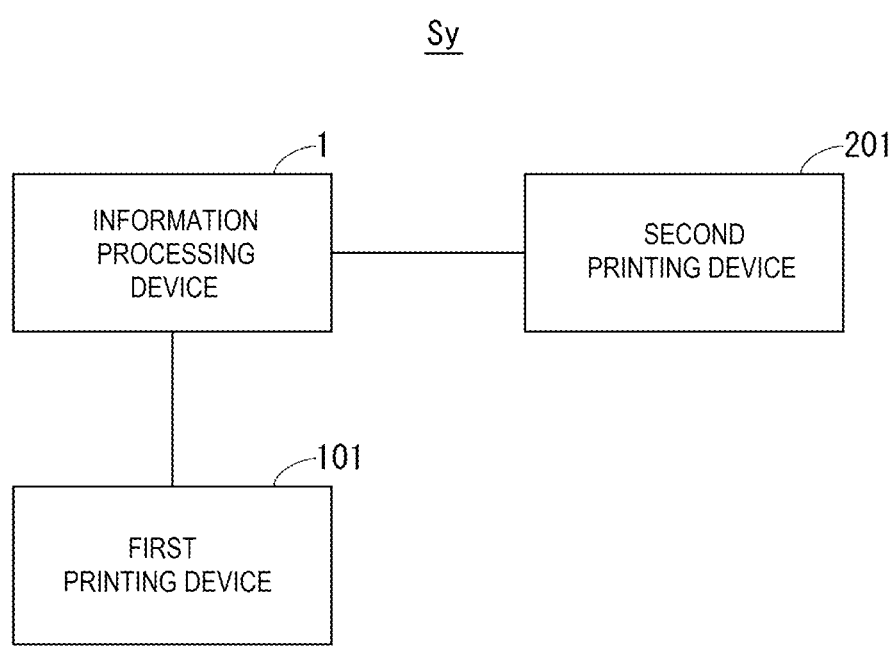
FIG. 1 is a block diagram of a printing system.

As shown in FIG. 1, a printing system Sy includes an information processing device 1, a first printing device 101, and a second printing device 201. The information processing device 1 and the first printing device 101 are coupled communicatively via a wire or wirelessly. Similarly, the information processing device 1 and the second printing device 201 are coupled communicatively via a wire or wirelessly. To the information processing device 1, another printing device than the first printing device 101 and the second printing device 201 may be communicatively coupled, or a device that is not a printing device may be communicatively coupled.

The information processing device 1 controls the first printing device 101 and causes the first printing device 101 to execute print processing. The information processing device 1 also controls the second printing device 201 and causes the second printing device 201 to execute print processing. As the information processing device 1, for example, a personal computer, smartphone, tablet terminal or the like can be used.

Figure 3:
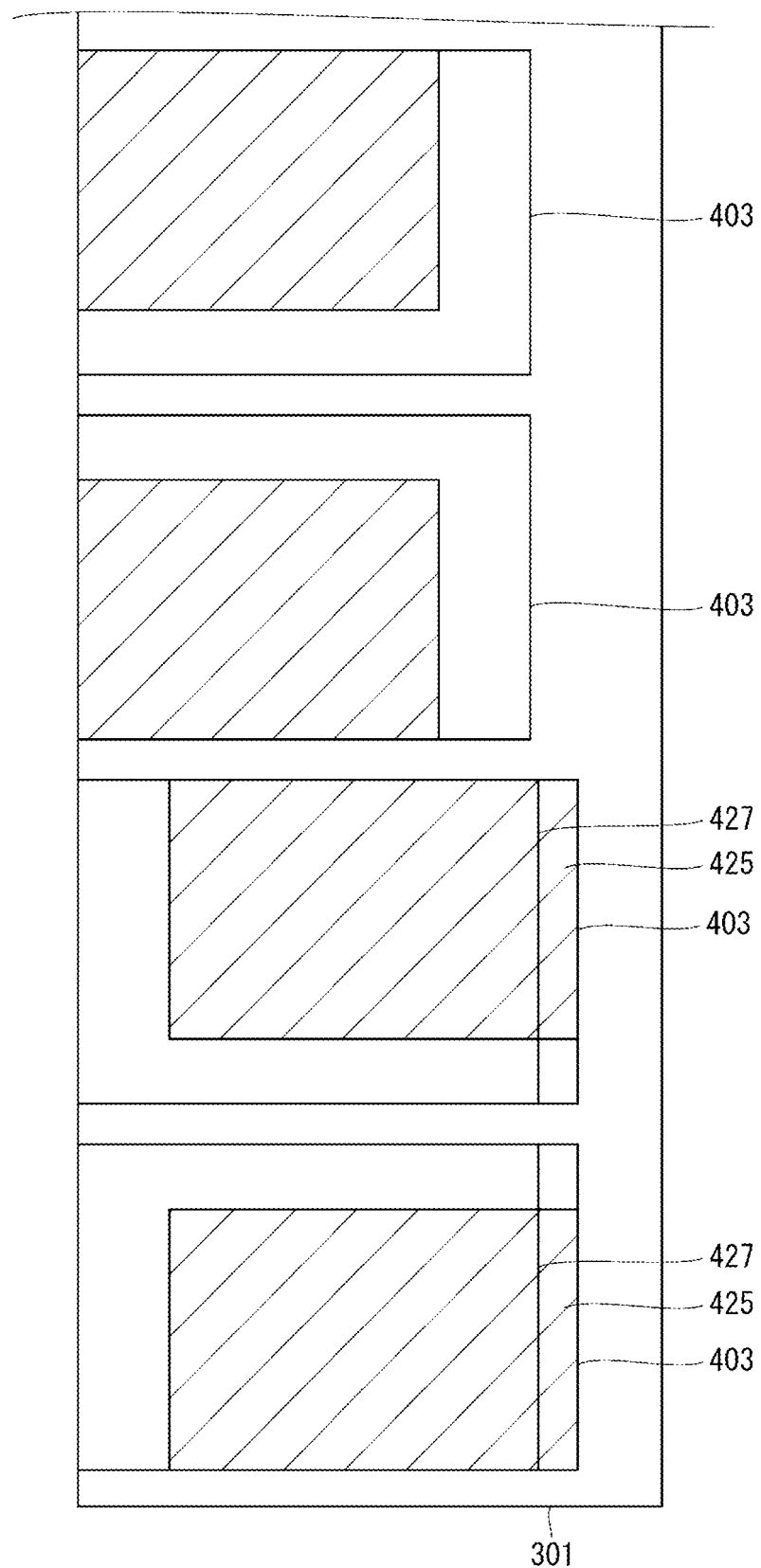
FIG. 3 shows a plurality of sub-images printed on the first print medium.

The first printing device 101 executes print processing based on a print job received from the information processing device 1 and thus prints an image on a first print medium 301 (see FIG. 3). The first printing device 101 is, for example, an industrial printer used to print signs and displays or the like. As the first print medium 301, a paper roll can be used. The width of the paper roll is, for example, 64 inches, that is, 1625.6 mm.

Figure 5:
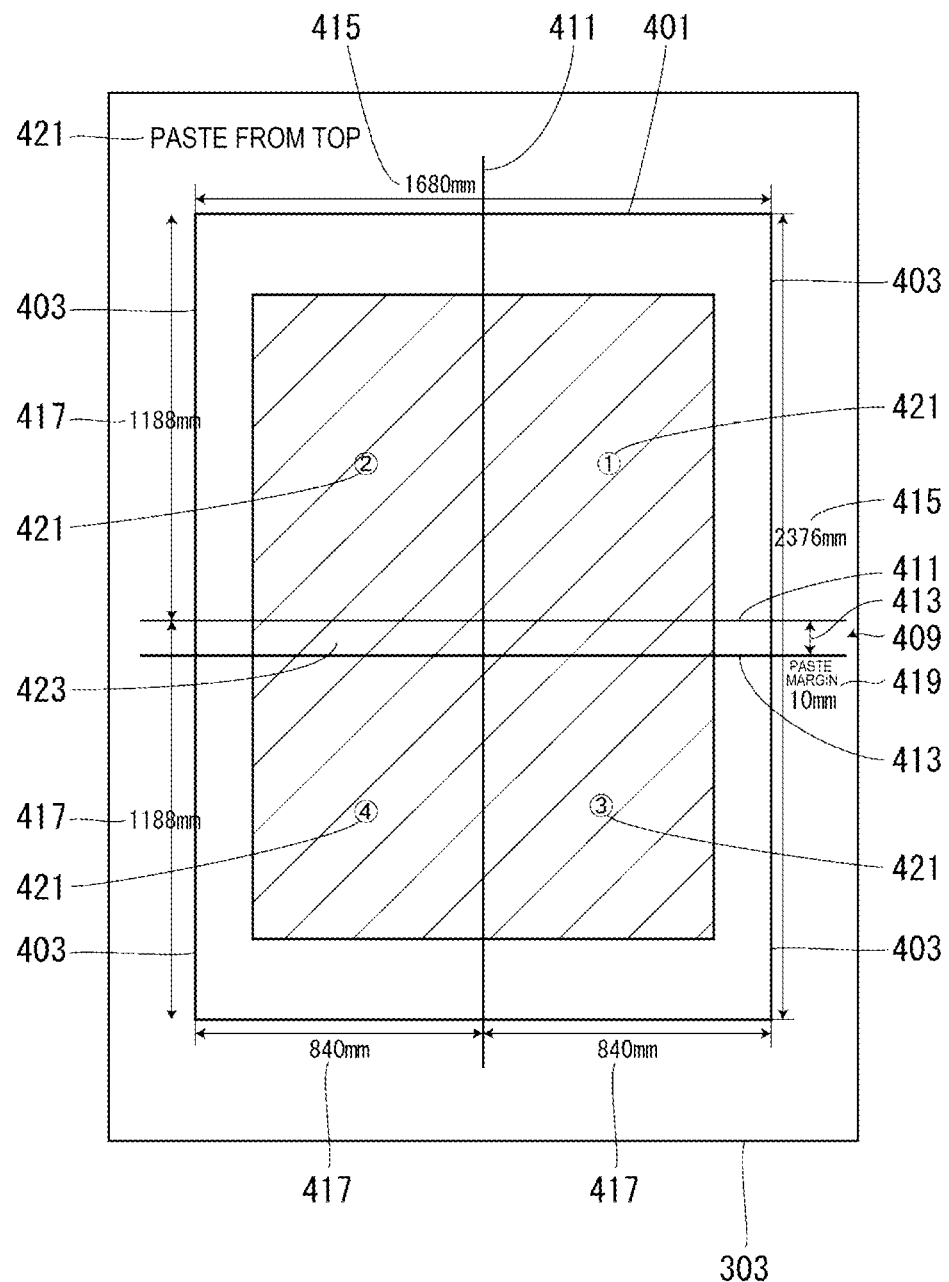
FIG. 5 shows a work execution instruction document.

The second printing device 201 executes print processing based on a print job received from the information processing device 1 and thus prints an image on a second print medium 303 (see FIG. 5). The second printing device 201 is, for example, a consumer printer used at home or a business printer used in an office. As the second print medium 303, cut paper can be used. The size of the cut paper is, for example, A4.

Split Printing and Work Execution Instruction Document

Split printing will now be described with reference to FIGS. 2 to 5. In the description below, image data that is a print target in split printing is referred to as original image data, and an image printed based on the original image data is referred to as an original image 401.

Figure 2:
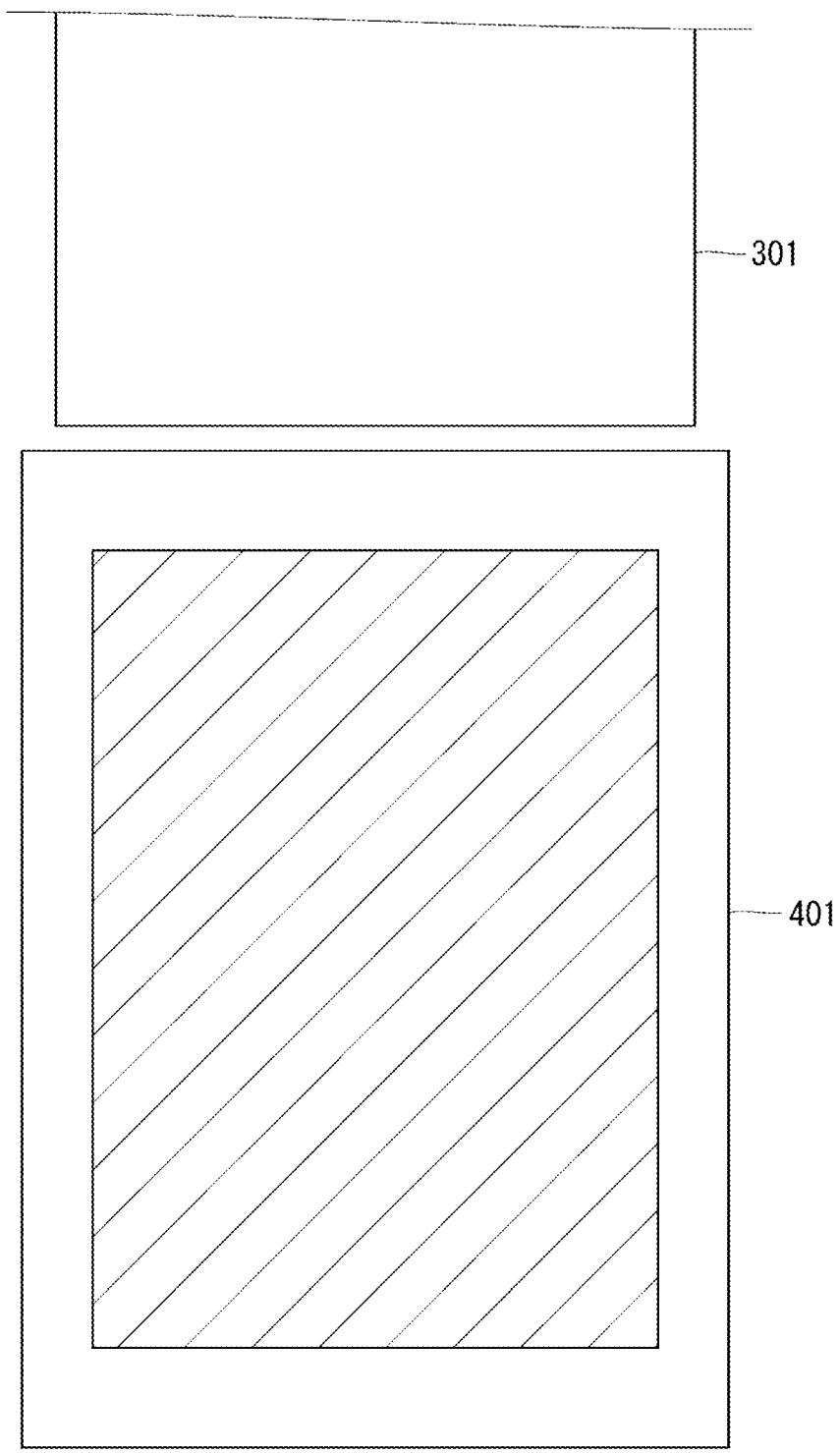
FIG. 2 shows a first print medium and an original image.
Figure 4:
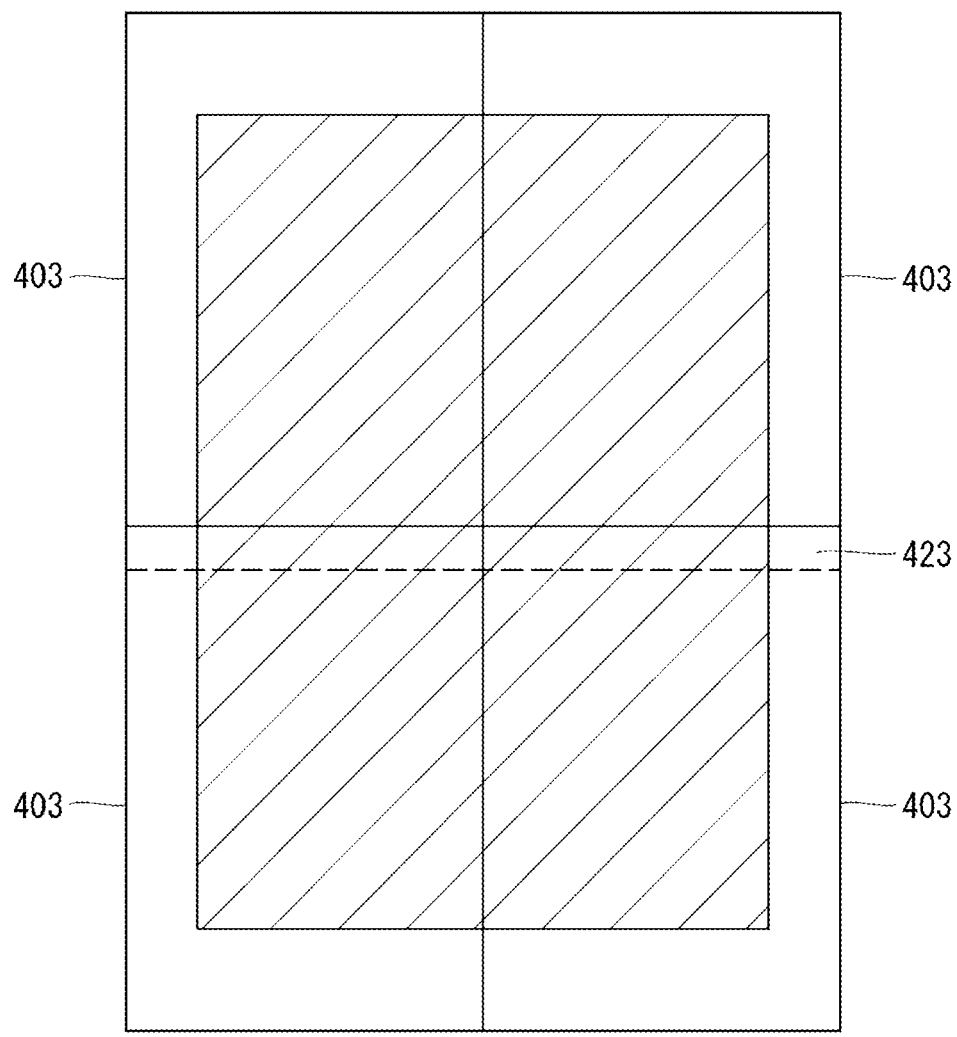
FIG. 4 shows a combined image formed by pasting a plurality of sub-images together.

When the dimension of the short side of the original image 401, that is, the shorter side of the longitudinal and lateral sides, is greater than the width of the first print medium 301 set in the first printing device 101, as shown in FIG. 2, the information processing device 1 can generate a plurality of sub-image data from the original image data in such a way that a plurality of sub-images 403 split from the original image 401 are printed, as shown in FIG. 3. The first printing device 101 prints the plurality of sub-images 403 on the first print medium 301, based on the plurality of sub-image data received from the information processing device 1. A user can create a combined image 405 that is greater than the width of the first print medium 301 by pasting together the plurality of sub-images 403 that are printed, as shown in FIG. 4.

The user printing the plurality of sub-images 403 is, for example, a printing business owner and is referred to as "printing user" in this paragraph. The user pasting the plurality of sub-images 403 together is a work executor and is referred to as "work execution user" in this paragraph. The printing user and the work execution user are often different people. Thus, the printing user provides the work execution user with a work execution instruction document 407 (see FIG. 5) along with the plurality of sub-images 403 so that the work execution user can accurately carry out the work of pasting the plurality of sub-images 403 together. The size of the work execution instruction document 407 is usually smaller than that of the sub-image 403 and is, for example, A4.

As shown in FIG. 5, the original image 401 and a work execution image 409 are shown in the work execution instruction document 407. The work execution image 409 is an image printed along with the original image 401 in the work execution instruction document 407. The work execution image 409 includes a split position image 411, an overlap area image 413, an original image size 415, a sub-image size 417, an overlap width 419, and a comment image 421.

The split position image 411 shows a split position in the original image 401. The split position image 411 is, for example, a solid line provided at the split position in the original image 401. The overlap area image 413 shows an overlap area 423. The overlap area 423 refers to an area where the sub-images 403 overlap each other when the plurality of sub-images 403 are pasted together using a paste margin 425 (see FIG. 3). In this embodiment, the overlap area image 413 includes a solid line provided substantially parallel to the split position image 411, and an arrow provided between this solid line and the split position image 411. The split position image 411 is not limited to a solid line and may be a dashed line, chain line or the like, or may be other forms than a line. The same applies to the overlap area image 413.

The original image size 415 shows the size of the original image 401. The sub-image size 417 shows the size of the sub-image 403. The overlap width 419 shows the width of the overlap area 423 and is equal to the width of the paste margin 425. The content of the comment image 421 is not particularly limited and shows, for example, the order of pasting the plurality of sub-images 403 together. In FIG. 5, numbers "1" to "4" printed on the respective sub-images 403 and a text "paste from top" are printed as the comment image 421 showing the order of pasting the plurality of sub-images 403 together.

Instruction document image data for printing the work execution instruction document 407 is generated by the information processing device 1. The work execution instruction document 407 is printed by a printing device selected as the printing destination of the work execution instruction document 407 by the user at the information processing device 1. That is, when the user at the information processing device 1 selects the first printing device 101, the first printing device 101 prints the work execution instruction document 407 on the first print medium 301, based on the instruction document image data received from the information processing device 1. When the user at the information processing device 1 selects the second printing device 201, the second printing device 201 prints the work execution instruction document 407 on the second print medium 303, based on the instruction document image data received from the information processing device 1.

Hardware Configuration of Information Processing Device and the Like

Figure 6:
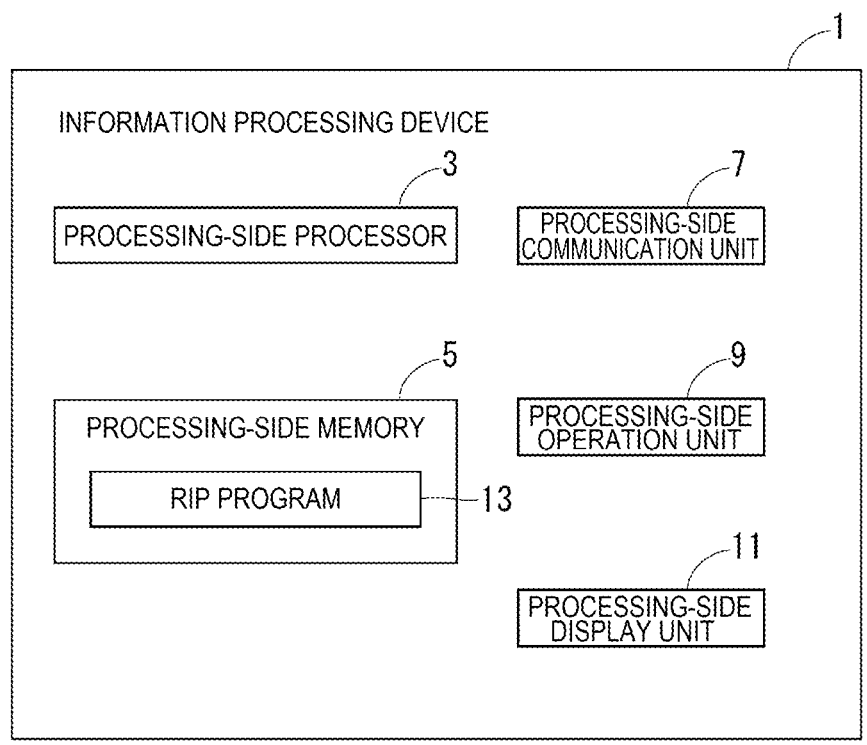
FIG. 6 is a block diagram showing the hardware configuration of an information processing device.

As shown in FIG. 6, the information processing device 1 has a processing-side processor 3, a processing-side memory 5, a processing-side communication unit 7, a processing-side operation unit 9, and a processing-side display unit 11.

The processing-side processor 3 executes various programs stored in the processing-side memory 5. The processing-side processor 3 is, for example, one or a plurality of CPUs (central processing units). The processing-side processor 3 may be a hardware circuit such as ASIC (application-specific integrated circuit) or may have a configuration where one or more CPUs and a hardware circuit collaboratively perform processing.

The processing-side memory 5 stores various programs and various data. The processing-side memory 5 has, for example, a ROM (read-only memory), a RAM (random-access memory), an EEPROM (electrically erasable programmable read-only memory), an HDD (hard disk drive), and an SSD (solid-state drive).

The various programs stored in the processing-side memory 5 include a RIP (raster image processing) program 13. The RIP program 13 is a program for the processing-side processor 3 to execute printing control processing to cause the first printing device 101 or the second printing device 201 to print an image.

The processing-side communication unit 7 transmits and receives various data and various commands to and from the first printing device 101. The processing-side communication unit 7 has, for example, a digital input/output port such as a USB (universal serial bus) port.

The processing-side operation unit 9 accepts an operation from the user. As the processing-side operation unit 9, for example, a keyboard, mouse, touch panel or the like can be used.

The processing-side display unit 11 displays various screens. As the processing-side display unit 11, for example, a liquid crystal display or organic EL (electroluminescence) display can be used.

Figure 7:
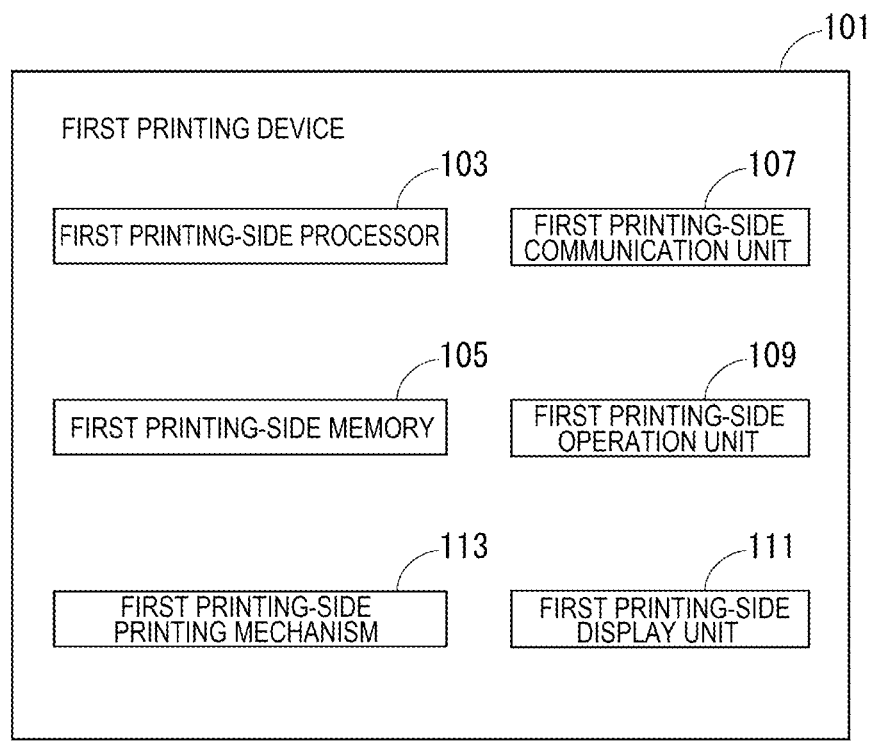
FIG. 7 is a block diagram showing the hardware configuration of a first printing device.

As shown in FIG. 7, the first printing device 101 has a first printing-side processor 103, a first printing-side memory 105, a first printing-side communication unit 107, a first printing-side operation unit 109, a first printing-side display unit 111, and a first printing-side printing mechanism 113.

The first printing-side processor 103 executes various programs stored in the first printing-side memory 105. The first printing-side processor 103 is, for example, one or a plurality of CPUs. The first printing-side processor 103 may be a hardware circuit such as ASIC or may have a configuration where one or more CPUs and a hardware circuit collaboratively perform processing.

The first printing-side memory 105 stores various programs and various data. The first printing-side memory 105 has, for example, a ROM, a RAM, an EEPROM, an HDD, and an SSD.

The first printing-side communication unit 107 transmits and receives various data and various commands to and from the information processing device 1. The first printing-side communication unit 107 has, for example, a digital input/output port such as a USB port.

The first printing-side operation unit 109 accepts an operation from the user. As the first printing-side operation unit 109, for example, an operation button, touch panel or the like can be used.

The first printing-side display unit 111 displays various screens. As the first printing-side display unit 111, for example, a liquid crystal display or organic EL display can be used.

The first printing-side printing mechanism 113 prints an image on the first print medium 301. The first printing-side printing mechanism 113 may preferably be able to perform color printing but may be configured to be able to perform monochrome printing only. As the printing system of the first printing-side printing mechanism 113, for example, an inkjet system or electrophotographic system can be used.

Figure 8:
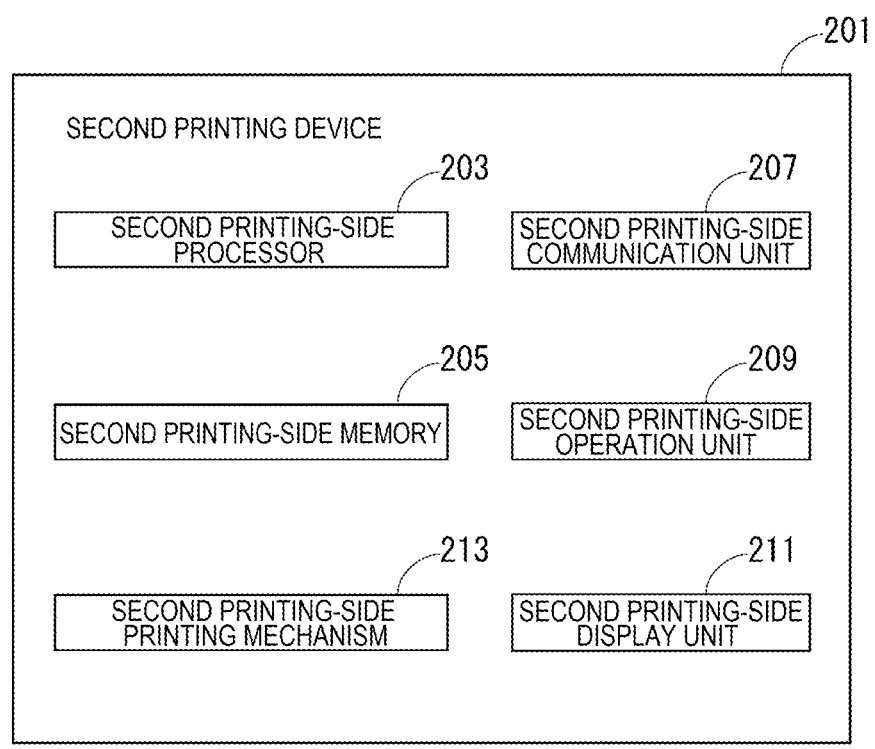
FIG. 8 is a block diagram showing the hardware configuration of a second printing device.

As shown in FIG. 8, the second printing device 201 has a second printing-side processor 203, a second printing-side memory 205, a second printing-side communication unit 207, a second printing-side operation unit 209, a second printing-side display unit 211, and a second printing-side printing mechanism 213. The second printing-side processor 203, the second printing-side memory 205, the second printing-side communication unit 207, the second printing-side operation unit 209, the second printing-side display unit 211, and the second printing-side printing mechanism 213 are configured similarly to the first printing-side processor 103, the first printing-side memory 105, the first printing-side communication unit 107, the first printing-side operation unit 109, the first printing-side display unit 111, and the first printing-side printing mechanism 113, respectively, and therefore will not be described further in detail.

Operation Screen and Split Printing Information for Split Printing

Figure 9:
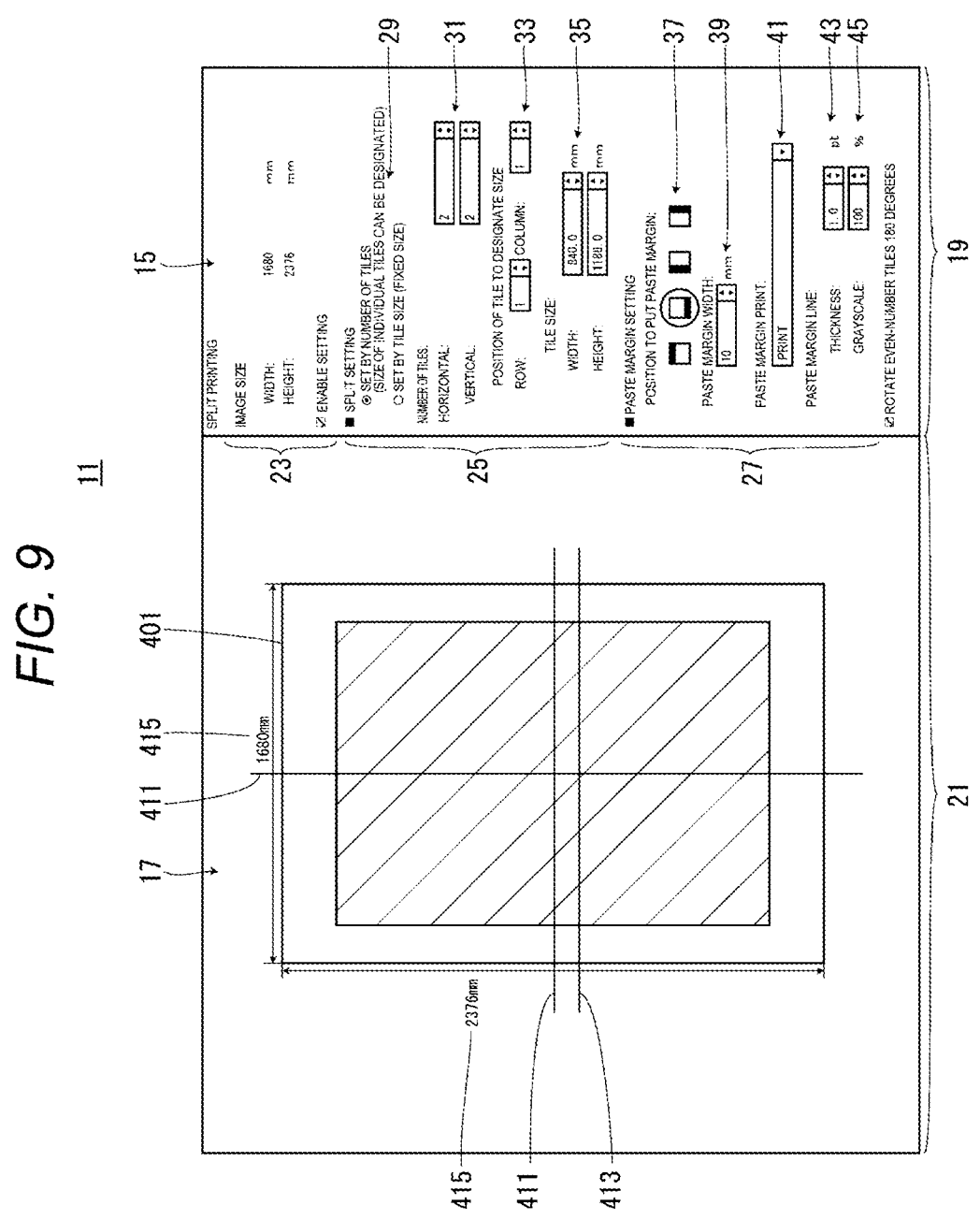

An operation screen and split printing information 47 for split printing will now be described with reference to FIGS. 9 to 11. In response to a predetermined operation after the RIP program 13 is started, the information processing device 1 displays a split printing information setting menu 15 and a split setting preview 17 on the processing-side display unit 11, as shown in FIG. 9. An area where the split printing information setting menu 15 is displayed is referred to as a setting area 19. An area where the split setting preview 17 is displayed is referred to as an image display area 21.

In the split printing information setting menu 15, an image size display area 23, a split setting area 25, and a paste margin setting area 27 are provided.

In the image size display area 23, the size of the original image 401 represented by the original image data is displayed.

In the split setting area 25, a setting selection button 29, a number-of-tiles input section 31, a tile designation section 33, and a tile size input section 35 are provided.

The setting selection button 29 includes "set by number of tiles" and "set by tile size". In this example, the "tile" means the sub-image 403. When "set by number of tiles" of the setting selection button 29 is selected, the number of tiles split from the original image 401 is inputted in the number-of-tiles input section 31 and the size of the sub-image 403 is automatically set according to the inputted number of tiles. Meanwhile, when "set by tile size" of the setting selection button 29 is selected, the size of the sub-image 403 is inputted in the tile size input section 35 and the number of tiles split from the original image 401 is automatically set according to the inputted size of the sub-image 403.

In the number-of-tiles input section 31, the number of tiles split from the original image 401 is inputted. In the tile designation section 33, a numerical value indicating the position of the sub-image 403 to be changed in size is inputted, in order for the user to change the size of a desired sub-image 403 after the size of the sub-image 403 is automatically set according to the number of tiles inputted in the number-of-tiles input section 31. In the tile size input section 35, the size of the sub-image 403 is inputted.

In the paste margin setting area 27, a paste margin position selection button 37, a paste margin width input section 39, a paste margin line print selection list 41, a thickness input section 43, and a grayscale input section 45 are provided.

With the paste margin position selection button 37, the position of the paste margin 425 (see FIG. 3), that is, a side where the paste margin 425 is provided, of the four sides of the sub-image 403, is selected. In the paste margin width input section 39, the width of the paste margin 425 is inputted. In the paste margin line print selection list 41, whether a paste margin line 427 (see FIG. 3) needs to be printed or not is selected. The paste margin line 427 is a line indicating the boundary of the paste margin 425. In the thickness input section 43, the thickness of the paste margin line 427 is inputted. In the grayscale input section 45, the grayscale value of the paste margin line 427 is inputted.

The split setting preview 17 is a preview showing how the original image 401 is split. The information processing device 1 displays the split setting preview 17 in the image display area 21, based on the original image data and the split printing information 47. In the split setting preview 17, the split position image 411, the overlap area image 413, and the original image size 415 are displayed in addition to the original image 401. The split position image 411 is displayed, based on split position information (see FIG. 10) included in the split printing information 47. The overlap area image 413 is displayed, based on overlap area information (see FIG. 10) included in the split printing information 47. The original image size 415 is displayed, based on the original image data. By seeing the split setting preview 17, the user can check how the original image 401 is split, before printing a plurality of sub-images 403.

As shown in FIG. 10, the split printing information 47 includes split position information, overlap area information, paste margin line printing information, paste margin line information, and comment information. The split position information is information about the split position in the original image 401. The split position information includes, for example, the number of tiles split from the original image 401 and the size of each sub-image 403 or the like. The split position information is set, based on the result of input in the split setting area 25. The overlap area information is information about the overlap area 423. The overlap area information includes the side where the paste margin 425 is provided and the width of the paste margin 425 or the like. The paste margin line printing information is information about whether to print the paste margin line 427 or not. The paste margin line information is information about the position, thickness, color, and type of the paste margin line 427. The type of the paste margin line 427 includes solid line, dashed line, chain line and the like. The overlap area information, the paste margin line printing information, and the paste margin line information are set, based on the result of input in the paste margin setting area 27. The comment information is information about the character string, position, color and the like forming the comment image 421. The comment information is set, based on an operation of adding the comment image 421 in an instruction document preview 51 as described later (see FIGS. 12 and 13).

The split position image 411 and the overlap area image 413 displayed in the split setting preview 17 can be moved, based on a moving operation such as a drag operation in the split setting preview 17. For example, when an operation of moving the split position image 411 displayed in the split setting preview 17 is carried out, the information processing device 1 changes the split position information included in the split printing information 47, based on the position of the split position image 411 after the movement. When an operation of moving the overlap area image 413 displayed in the split setting preview 17 is carried out, the information processing device 1 changes the overlap area information included in the split printing information 47, based on the position of the overlap area image 413 after the movement.

Figure 11:
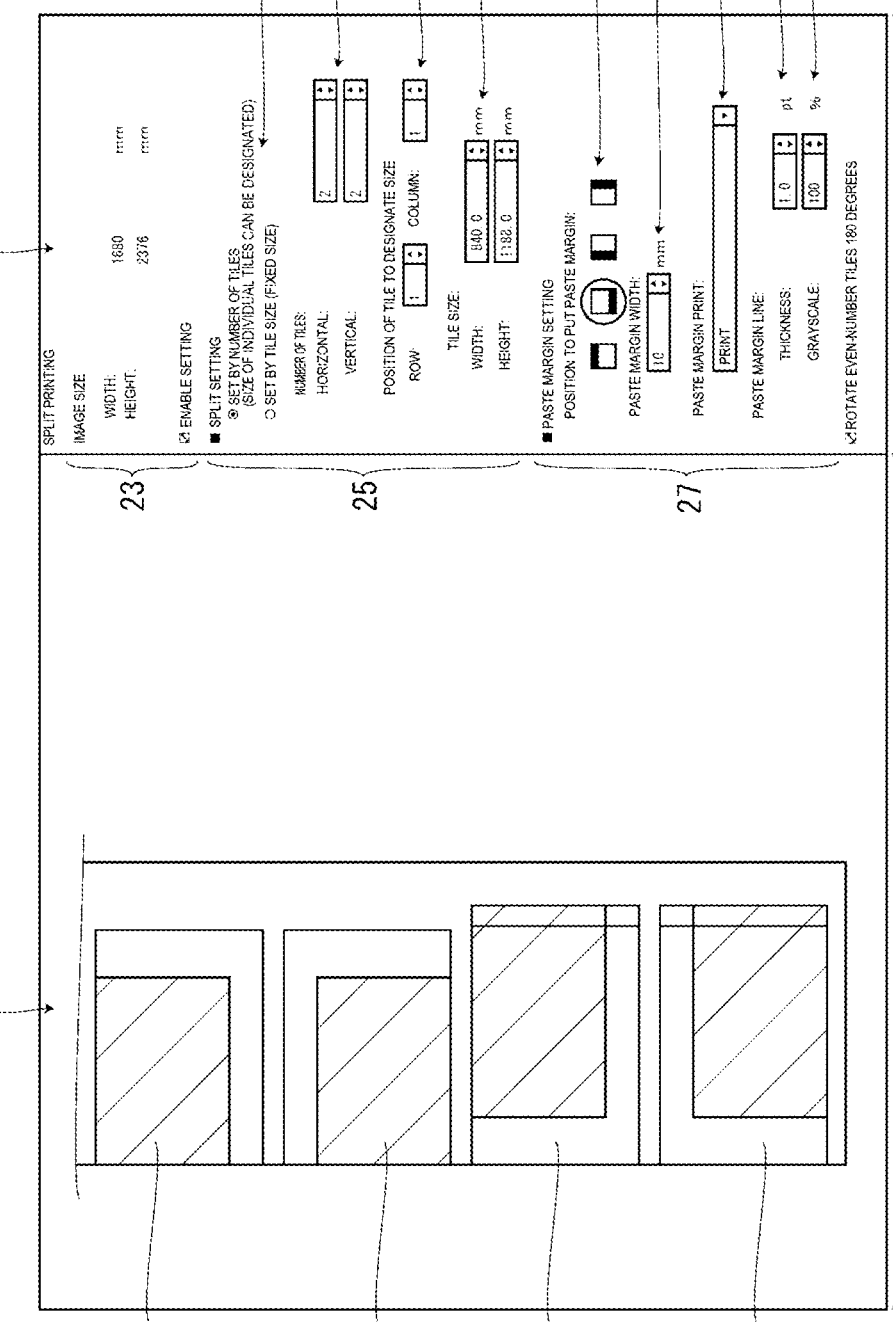
FIG. 11 shows a split printing information setting menu and a split print preview.

When a predetermined operation is carried out after the split printing information 47 is set, the information processing device 1 displays a split printing preview 49 in the image display area 21, as shown in FIG. 11, based on the original image data and the split printing information 47. The split printing preview 49 is a print preview of the plurality of sub-images 403. When an operation of designating execution of printing is carried out in this state, the information processing device 1 generates a print job including a plurality of sub-image data and transmits the generated print job to the first printing device 101. The plurality of sub-images 403 are thus printed on the first print medium 301 by the first printing device 101, as shown in FIG. 3.

Instruction Document Preview and Instruction Document Information

Figure 12:
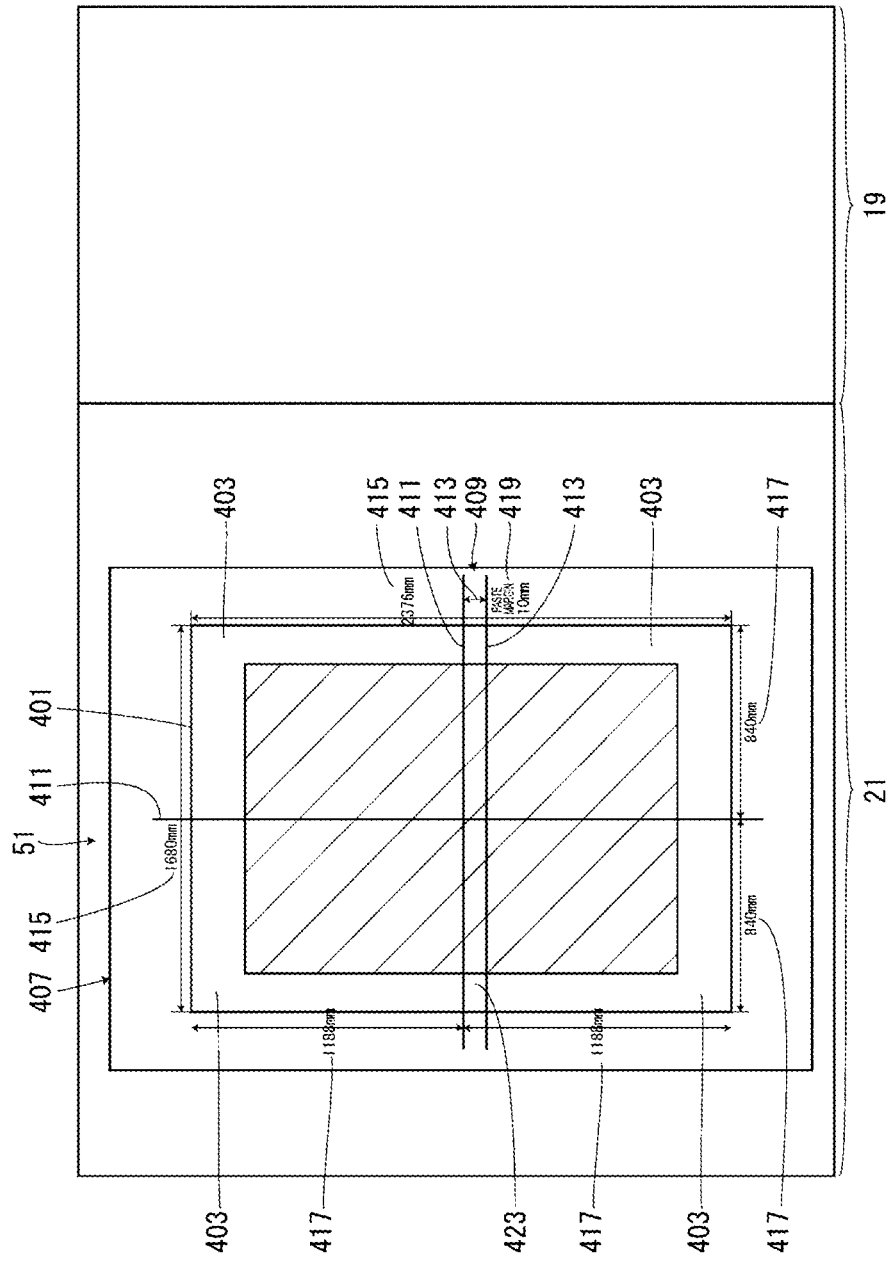
FIG. 12 shows an instruction document preview.
Figure 13:
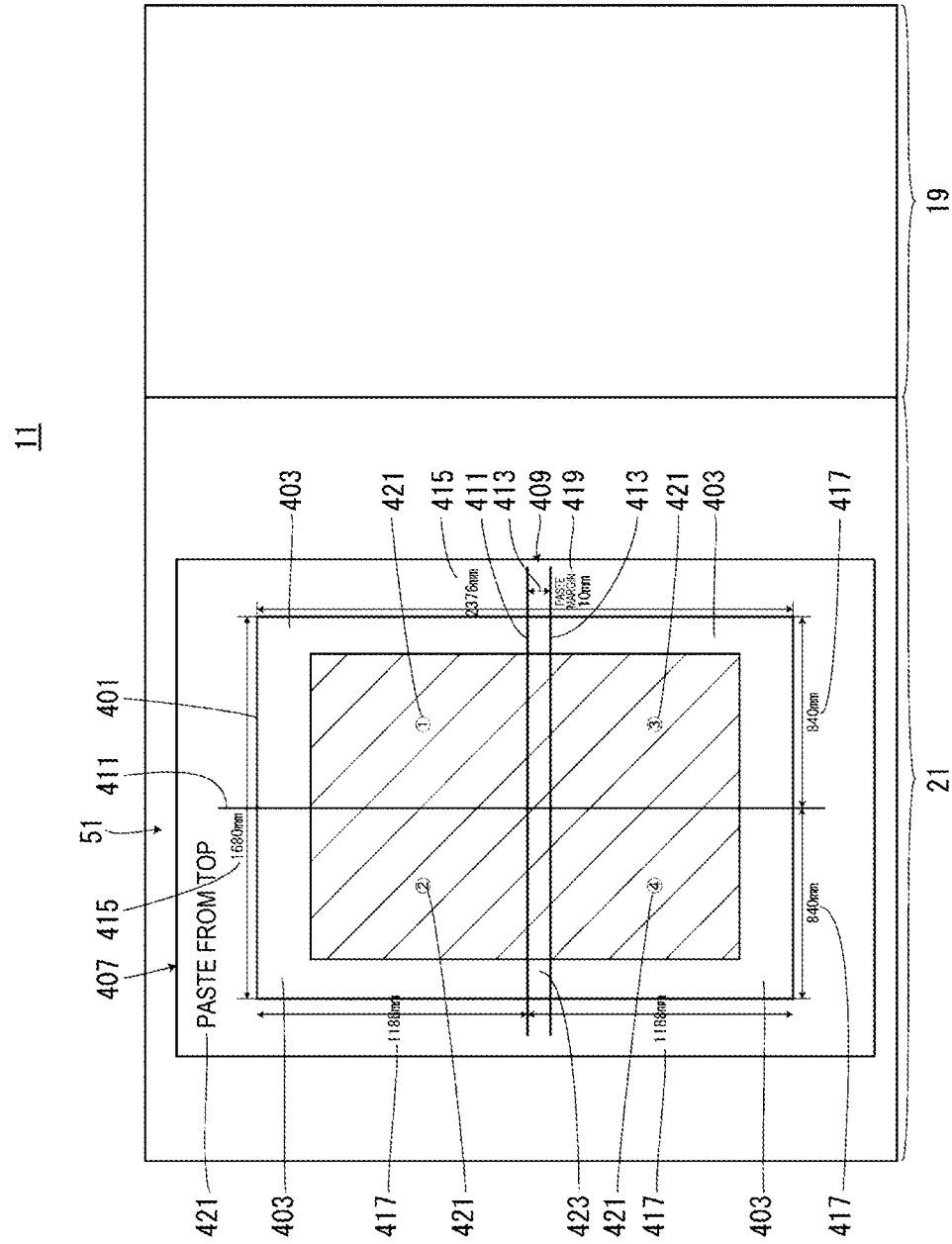
FIG. 13 shows a state where a comment image is added in the instruction document preview.

The instruction document preview 51 and instruction document information 53 will now be described with reference to FIGS. 12 to 15. When a predetermined operation is carried out after the split printing information 47 is set, the information processing device 1 displays the instruction document preview 51 in the image display area 21, as shown in FIG. 12, based on the original image data and the split printing information 47. The information processing device 1 also sets instruction document information 53 based on the split printing information 47. In this embodiment, when the instruction document preview 51 is displayed, nothing is displayed in the setting area 19. However, the split printing information setting menu 15 or other items may be displayed in the setting area 19.

The instruction document preview 51 is a preview for setting the instruction document information 53 and is also a print preview of the work execution instruction document 407. The instruction document preview 51 is not limited to being configured to be displayed in the image display area 21 and may be configured to be displayed in a window that is different from the window where the image display area 21 is provided, or may be configured to be displayed on a tab that is different from the tab where the image display area 21 is provided.

In the instruction document preview 51, the work execution instruction document 407 is displayed. The work execution instruction document 407 includes the original image 401 and the work execution image 409. However, in the initial stage where the instruction document preview 51 is displayed in the image display area 21, the comment image 421 is not displayed (see FIG. 12). The comment image 421 is displayed in the instruction document preview 51, based on an input operation in the instruction document preview 51 (see FIG. 13).

As shown in FIG. 14, the instruction document information 53 includes split position information, overlap area information, paste margin line printing information, paste margin line information, and comment information, similarly to the split printing information 47.

The work execution image 409 displayed in the instruction document preview 51 can be changed by a user's operation.

For example, the split position image 411 and the overlap area image 413 displayed in the instruction document preview 51 can be moved, based on a movement operation in the instruction document preview 51, similarly to the split position image 411 and the overlap area image 413 displayed in the split setting preview 17. When an operation of moving the split position image 411 displayed in the instruction document preview 51 is carried out, the information processing device 1 changes the split position information included in the instruction document information 53, based on the position of the split position image 411 after the movement. When an operation of moving the overlap area image 413 displayed in the instruction document preview 51 is carried out, the information processing device 1 changes the overlap area information included in the instruction document information 53, based on the position of the overlap area image 413 after the movement.

The thickness, color, and type of the paste margin line 427 displayed in the instruction document preview 51 can be changed, based on a selection operation in the instruction document preview 51. When the thickness, color or type of the paste margin line 427 displayed in the instruction document preview 51 is changed, the information processing device 1 changes the paste margin line information included in the instruction document information 53, based on the thickness, color or type of the paste margin line 427 after the change.

As described above, the comment image 421 can be added in the instruction document preview 51, based on an input operation in the instruction document preview 51. When the comment image 421 is added in the instruction document preview 51, the information processing device 1 changes the comment information included in the instruction document information 53, based on the added comment image 421.

When an operation of changing the work execution image 409 displayed in the instruction document preview 51 is carried out in this way, the information processing device 1 determines whether the change in the work execution image 409 is a first change or a second change. The first change is a change in which the user is not asked whether or not to change the split printing information 47, based on the work execution image 409 after the change. The first change includes, for example, moving the split position image 411, moving the overlap area image 413, and the like. Meanwhile, the second change is a change in which the user is asked whether or not to change the split printing information 47, based on the work execution image 409 after the change. The second change includes, for example, changing the thickness, color or type of the paste margin line 427, adding the comment image 421, and the like.

When the information processing device 1 has determined that the change in the work execution image 409 is the first change, the information processing device 1 changes the instruction document information 53 and the split printing information 47, based on the work execution image 409 after the change. Therefore, the user can make the split printing information 47 constantly reflect the result of change in the work execution image 409 in the instruction document preview 51.

For example, when an operation of moving the split position image 411 in the instruction document preview 51 is carried out, the information processing device 1 determines that the change in the split position image 411 is the first change, and therefore changes the split position information included in the instruction document information 53 and changes the split position information included in the split printing information 47, based on the position of the split position image 411 after the movement. Therefore, the operation to change the split printing information 47 is reduced and user-friendliness is improved. That is, the user can change the split position in the original image 401 without carrying out the operation to change the split position in the original image 401, in the split printing information setting menu 15 or the split setting preview 17, apart from moving the split position image 411 in the instruction document preview 51.

Meanwhile, when the information processing device 1 has determined that the change in the work execution image 409 is the second change, the information processing device 1 changes the instruction document information 53, based on the work execution image 409 after the change, and displays a confirmation window 55 on the processing-side display unit 11, as shown in FIG. 15. The confirmation window 55 is to ask the user whether or not to change the split printing information 47, based on the work execution image 409 after the change. When changing the split printing information 47 based on the work execution image 409 after the change is selected in the confirmation window 55, the information processing device 1 changes the split printing information 47, based on the work execution image 409 after the change. In this case, the result of change in the work execution image 409 in the instruction document preview 51 is reflected in the split printing information 47. Meanwhile, when not changing the split printing information 47 based on the work execution image 409 after the change is selected in the confirmation window 55, the information processing device 1 does not change the split printing information 47, based on the work execution image 409 after the change. In this case, the result of change in the work execution image 409 in the instruction document preview 51 is not reflected in the split printing information 47. Thus, the user can make the split printing information 47 reflect the result of change in the work execution image 409 in the instruction document preview 51 according to need.

For example, when an operation of changing the color of the paste margin line 427 is carried out in the instruction document preview 51, the information processing device 1 determines that the change in the color of the paste margin line 427 is the second change, and therefore changes the instruction document information 53 and displays the confirmation window 55 on the processing-side display unit 11. Thus, the user can choose whether or not to change the color of the paste margin line 427 printed with the plurality of sub-images 403, to the color of the paste margin line 427 changed in the instruction document preview 51. Specifically, while the user changes the color of the paste margin line 427 to a striking color in the instruction document preview 51 in order to highlight the paste margin line 427 in the work execution instruction document 407, the user may choose not to change the split printing information 47 based on the work execution image 409 after the change, in the confirmation window 55, when not wanting to highlight the paste margin line 427 in the printed sub-image 403. Thus, the user can obtain the work execution instruction document 407 with the paste margin line 427 printed in a striking color and the sub-image 403 with the paste margin line 427 printed in an obscure color.

When an operation of adding the comment image 421 is carried out in the instruction document preview 51, the information processing device 1 determines that the addition of the comment image 421 is the second change, and therefore changes the instruction document information 53 and displays the confirmation window 55 on the processing-side display unit 11. Thus, the user can choose whether or not to print the comment image 421 added in the instruction document preview 51, along with the plurality of sub-images 403. Specifically, while the user adds the comment image 421 in the instruction document preview 51 in order to clarify the order of pasting the plurality of sub-images 403 together in the work execution instruction document 407, the user may choose not to change the split printing information 47 based on the work execution image 409 after the change, in the confirmation window 55, when not wanting to include the comment image 421 in the printed sub-images 403. Thus, the user can obtain the work execution instruction document 407 with the comment image 421 added therein and the sub-image 403 without the comment image 421 printed thereon.

In this way, when an operation for the first change is carried out in the instruction document preview 51 or when changing the split printing information 47 is selected in the confirmation window 55 after an operation for the second change is carried out in the instruction document preview 51, the split printing information 47 is changed, based on the work execution image 409 after the change. Thus, the result of change in the work execution image 409 in the instruction document preview 51 can be reflected in the split setting preview 17, the split printing preview 49, and the printed sub-image 403. That is, the work execution instruction document 407 and the content of the actual splitting of the original image 401 become consistent with each other.

Functional Configuration of Information Processing Device

Figure 16:
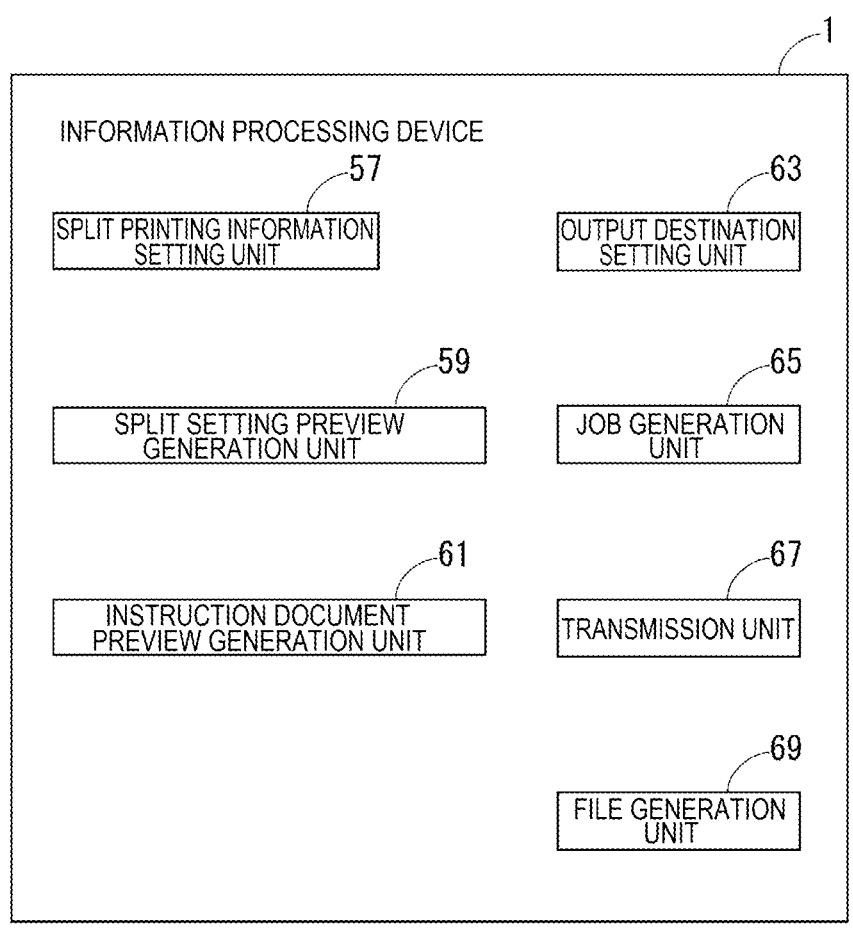
FIG. 16 is a block diagram showing the functional configuration of the information processing device.

The functional configuration of the information processing device 1 will now be described with reference to FIG. 16. The information processing device 1 has a split printing information setting unit 57, a split setting preview generation unit 59, an instruction document preview generation unit 61, an output destination setting unit 63, a job generation unit 65, a transmission unit 67, and a file generation unit 69. These functional units are implemented by the processing-side processor 3 executing the RIP program 13.

The split printing information setting unit 57 sets the split printing information 47, based on an operation on the split printing information setting menu 15 or the split setting preview 17. The split printing information setting unit 57 also changes the split printing information 47, based on an operation of changing the work execution image 409 displayed in the instruction document preview 51.

The split setting preview generation unit 59 generates the split setting preview 17, based on the original image data and the split printing information 47.

The instruction document preview generation unit 61 generates the instruction document preview 51, based on the original image data and the split printing information 47.

Figure 17:
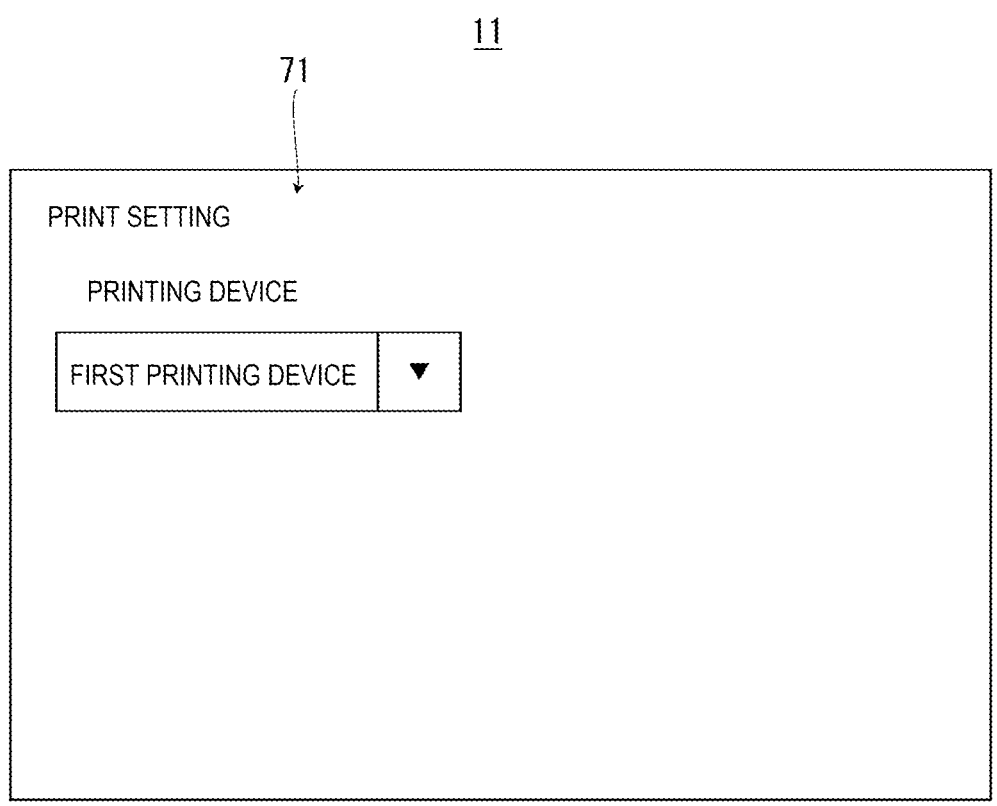
FIG. 17 shows a print setting screen.

The output destination setting unit 63 sets an output destination of image data, based on an operation on a print setting screen 71 (see FIG. 17). The print setting screen 71 is displayed on the processing-side display unit 11, based on a predetermined operation. In the print setting screen 71, the first printing device 101, the second printing device 201, and an electronic data file format are displayed as output destinations of image data.

The job generation unit 65 performs RIP processing on image data and generates a print job including the RIP-processed image data, when the first printing device 101 or the second printing device 201 is selected in the print setting screen 71.

The transmission unit 67 transmits the print job generated by the job generation unit 65 to the printing device set by the output destination setting unit 63.

The file generation unit 69 generates an electronic data file in a predetermined file format based on image data and saves the generated electronic data file in the processing-side memory 5, when a predetermined electronic data file format is selected in the print setting screen 71. The predetermined electronic data file format is, for example, the PDF format (Portable Document Format), the XPS format (XML Paper Specification) or the like.

Printing Control Processing for Work Execution Instruction Document

Figure 18:
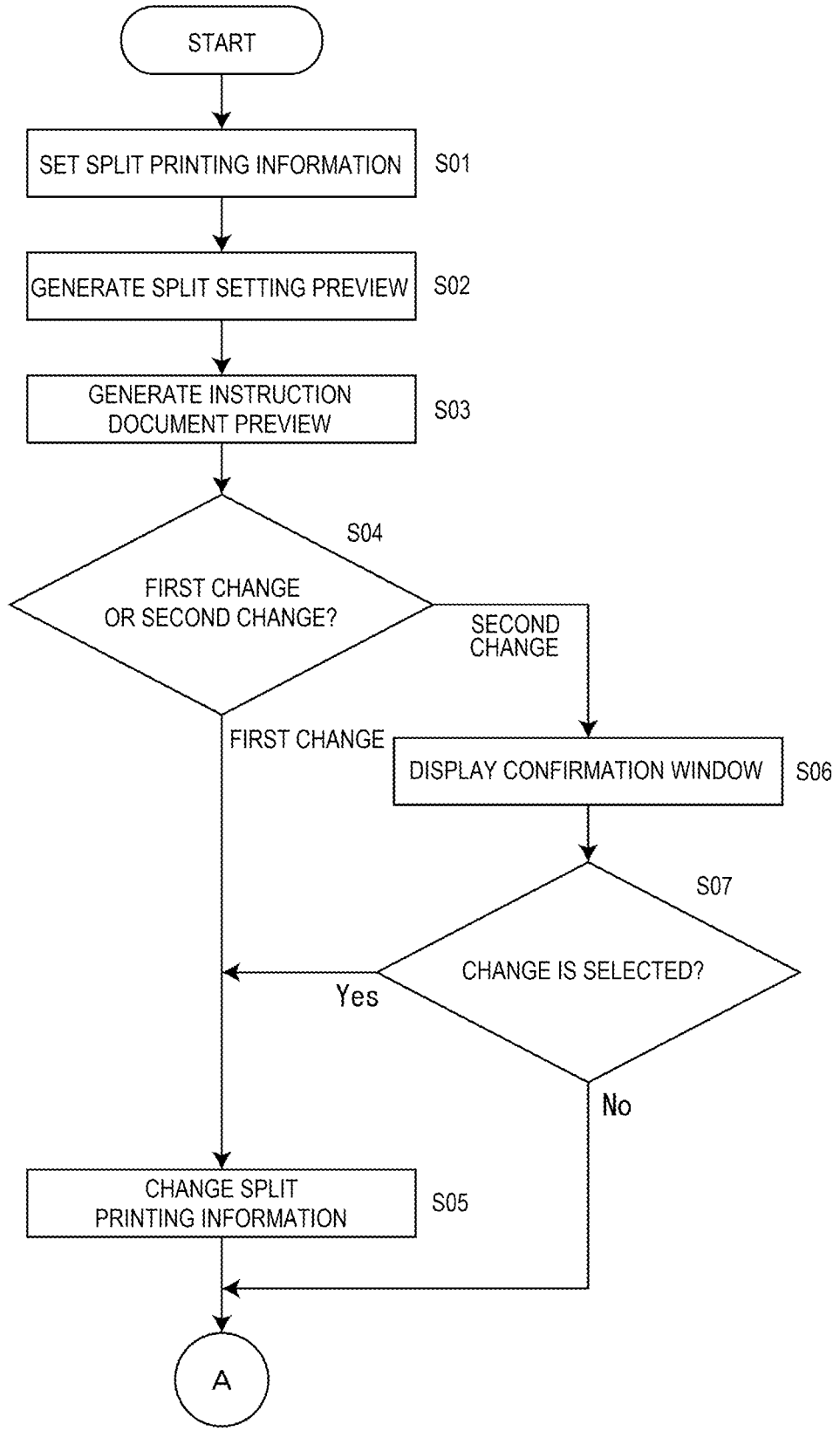
FIG. 18 is a flowchart showing printing control processing executed by the information processing device to print a work execution instruction document.
Figure 19:
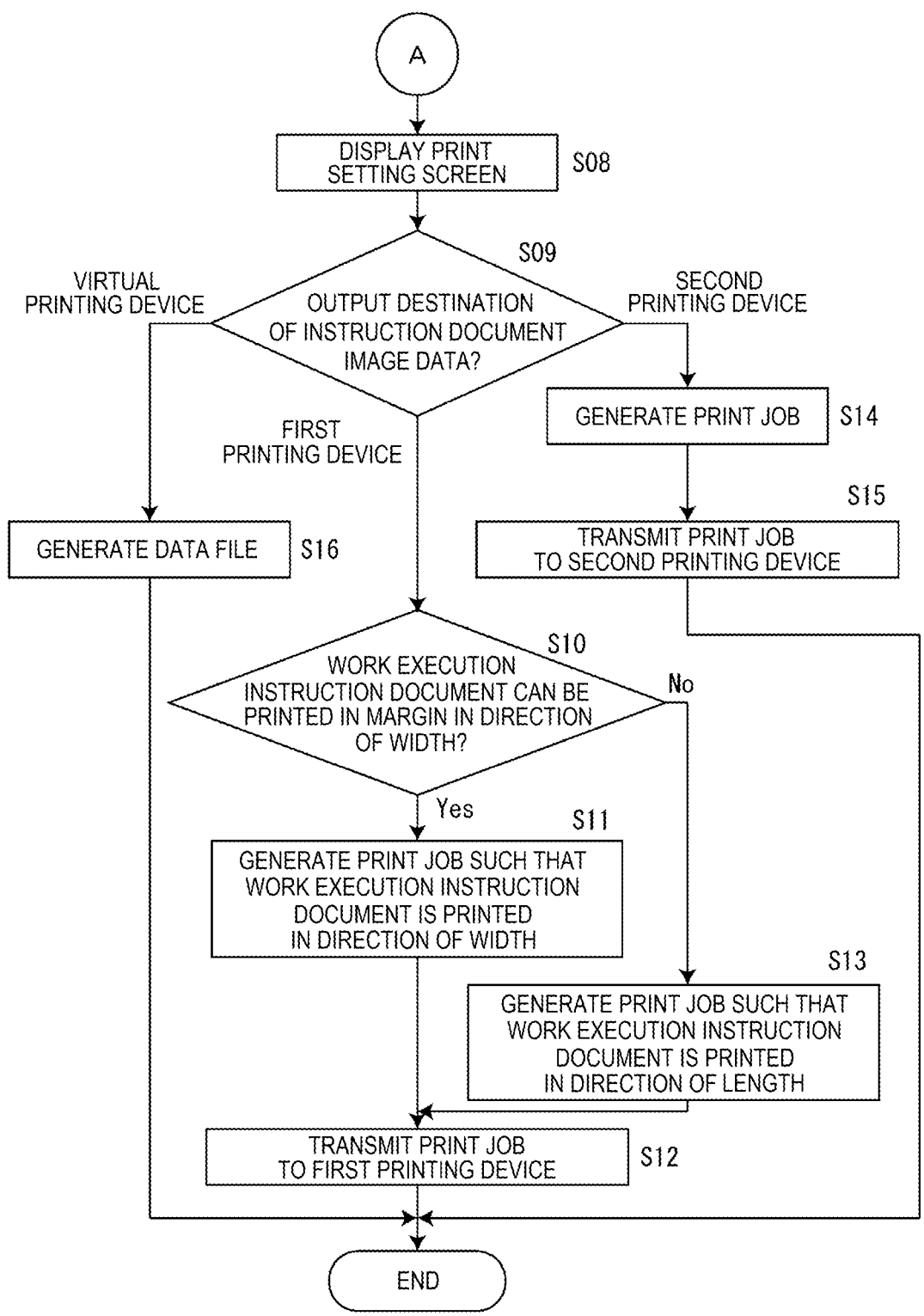
FIG. 19 is a flowchart continuing from FIG. 18.

Printing control processing executed by the information processing device 1 to print the work execution instruction document 407 will now be described with reference to FIGS. 18 and 19.

In step S01, the split printing information setting unit 57 sets the split printing information 47, based on the result of input in the split printing information setting menu 15.

In step S02, the split setting preview generation unit 59 generates the split setting preview 17, based on the original image data and the split printing information 47.

In step S03, the instruction document preview generation unit 61 generates the instruction document preview 51, based on the original image data and the split printing information 47, when a predetermined operation is carried out.

In step S04, after an operation of changing the work execution image 409 is carried out in the instruction document preview 51, the split printing information setting unit 57 determines whether the change in the work execution image 409 is the first change or the second change. When the split printing information setting unit 57 has determined that the change in the work execution image 409 is the first change, the split printing information setting unit 57 proceeds to step S05.

In step S05, the split printing information setting unit 57 changes the split printing information 47, based on the work execution image 409 after the change.

Meanwhile, when the split printing information setting unit 57 has determined in step S04 that the change in the work execution image 409 is the second change, the split printing information setting unit 57 proceeds to step S06.

In step S06, the split printing information setting unit 57 displays the confirmation window 55 on the processing-side display unit 11.

In step S07, the split printing information setting unit 57 determines whether changing the split printing information 47 based on the work execution image 409 after the change is selected in the confirmation window 55 or not. When the split printing information setting unit 57 has determined that changing the split printing information 47 based on the work execution image 409 after the change is selected in the confirmation window 55, the split printing information setting unit 57 proceeds to step S05. Meanwhile, when the split printing information setting unit 57 has determined that changing the split printing information 47 based on the work execution image 409 after the change is not selected in the confirmation window 55, the processing proceeds to step S08.

In step S08, the output destination setting unit 63 displays the print setting screen 71 on the processing-side display unit 11 when a predetermined operation is carried out.

In step S09, the output destination setting unit 63 designates an output destination of instruction document image data, based on an operation on the print setting screen 71. When the output destination setting unit 63 has set the first printing device 101 as the output destination of instruction document image data, the processing proceeds to step S10.

In step S10, the job generation unit 65 determines whether the work execution instruction document 407 can be printed in a margin 429 (see FIG. 20) in the direction of the width of the first print medium 301 in relation to the plurality of sub-images 403 printed on the first print medium 301, or not. The job generation unit 65 determines whether the work execution instruction document 407 can be printed in the margin 429 in the direction of the width of the first print medium 301 in relation to the plurality of sub-images 403 or not, for example, based on whether the dimension of the margin 429 in the direction of the width of the first print medium 301 is greater than the dimension of the short side of the work execution instruction document 407 or not. When the job generation unit 65 has determined that the work execution instruction document 407 can be printed in the margin 429 in the direction of the width of the first print medium 301 in relation to the plurality of sub-images 403, the job generation unit 65 proceeds to step S11. The direction of the width of the first print medium 301 intersects the direction of transporting the first print medium 301 in the first printing device 101.

In step S11, the job generation unit 65 generates a plurality of sub-image data, based on the original image data and the split printing information 47, and performs RIP processing on the plurality of sub-image data. The job generation unit 65 also generates instruction document image data, based on the original image data and the instruction document information 53, and performs RIP processing on the instruction document image data. The job generation unit 65 then generates a print job including the plurality of sub-image data and the instruction document image data in such a way that the plurality of sub-images 403 and the work execution instruction document 407 arranged in the direction of the width of the first print medium 301 in relation to the plurality of sub-images 403 are printed on the first print medium 301.

Figure 20:
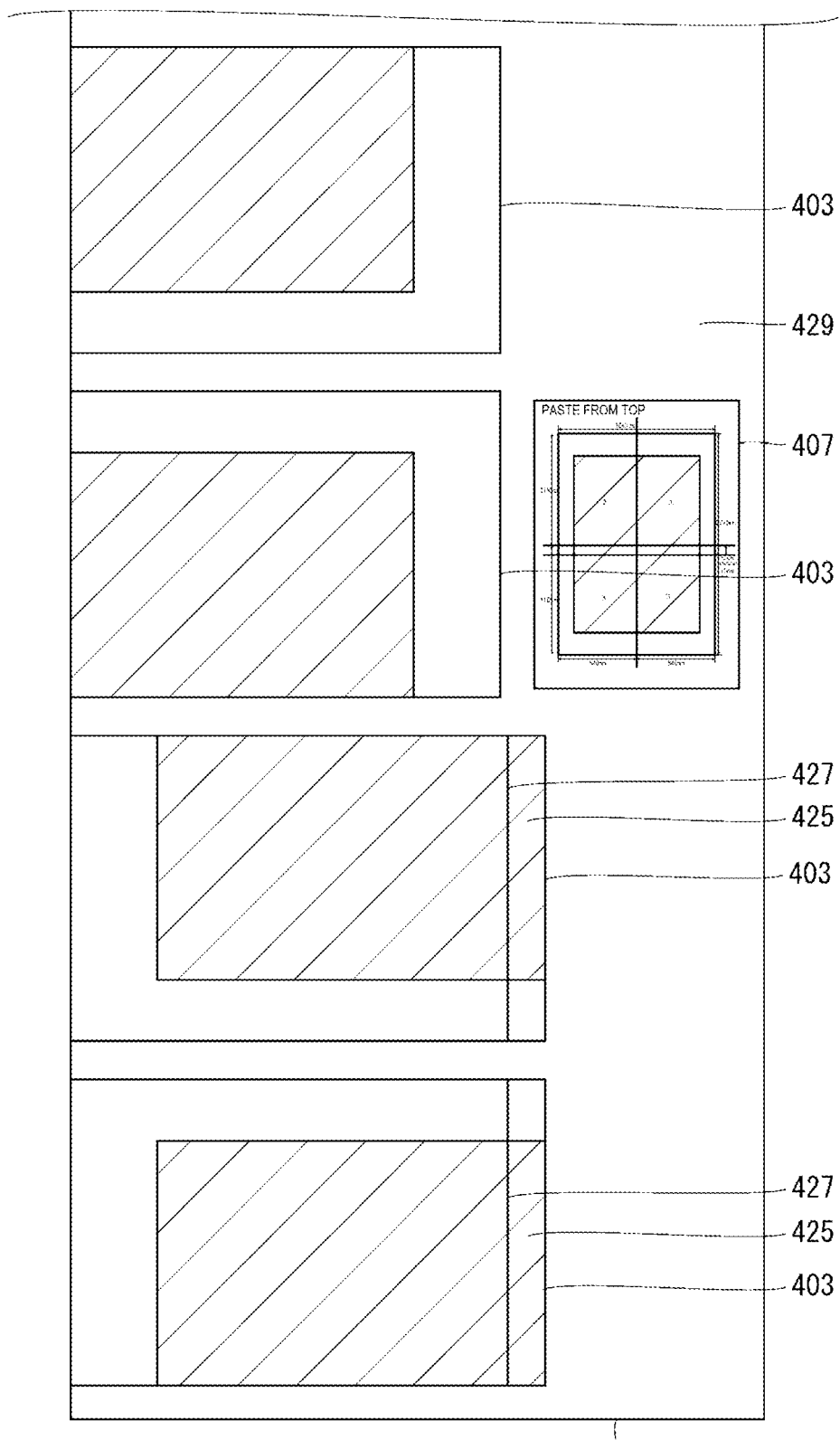
FIG. 20 shows a state where a plurality of sub-images and a work execution instruction document arranged in the direction of the width of the first print medium in relation to the plurality of sub-images are printed on the first print medium.

In step S12, the transmission unit 67 transmits the generated print job to the first printing device 101. Thus, the plurality of sub-images 403 and the work execution instruction document 407 arranged in the direction of the width of the first print medium 301 in relation to the plurality of sub-images 403 are printed on the first print medium 301 by the first printing device 101, as shown in FIG. 20.

Meanwhile, when the job generation unit 65 has determined in step S10 that the work execution instruction document 407 cannot be printed in the margin 429 in the direction of the width of the first print medium 301 in relation to the plurality of sub-images 403, the job generation unit 65 proceeds to step S13.

In step S13, as in step S11, the job generation unit 65 generates a plurality of sub-image data and instruction document image data and performs RIP processing on the plurality of sub-image data and the instruction document image data. The job generation unit 65 then generates a print job including the plurality of sub-image data and the instruction document image data in such a way that the plurality of sub-images 403 and the work execution instruction document 407 arranged in the direction of the length of the first print medium 301 in relation to the plurality of sub-images 403 are printed on the first print medium 301. The direction of the length of the first print medium 301 is substantially parallel to the direction of transporting the first print medium 301 in the first printing device 101.

Figure 21:
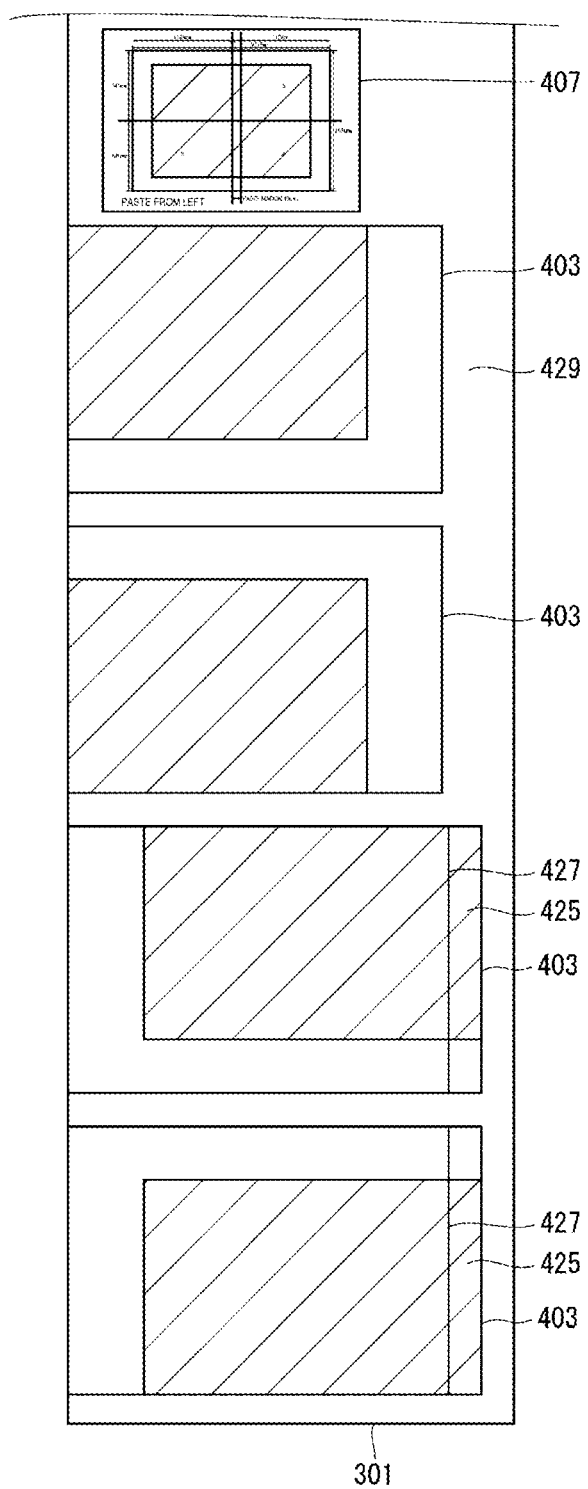
FIG. 21 shows a state where a plurality of sub-images and a work execution instruction document arranged in the direction of the length of the first print medium in relation to the plurality of sub-images are printed on the first print medium.

Subsequently, the processing proceeds to step S12, where the transmission unit 67 transmits the generated print job to the first printing device 101. Thus, the plurality of sub-images 403 and the work execution instruction document 407 arranged in the direction of the length of the first print medium 301 in relation to the plurality of sub-images 403 are printed on the first print medium 301 by the first printing device 101, as shown in FIG. 21. In this case, the information processing device 1 may cause the work execution instruction document 407 to be printed on the first print medium 301 in such a way that the short side of the work execution instruction document 407 is substantially parallel to the direction of the length of the first print medium 301 in order to restrain the amount of the first print medium 301 consumed.

As the work execution instruction document 407 is thus printed along with the plurality of sub-images 403 on the first print medium 301, the work execution instruction document 407 can function as a simple color chart for the plurality of sub-images 403. When the work execution instruction document 407 is printed in the direction of the width of the first print medium 301 in relation to the plurality of sub-images 403, increase in the amount of the first print medium 301 consumed can be restrained.

When the output destination setting unit 63 has set the second printing device 201 as the output destination of instruction document image data in step S09, the processing proceeds to step S14.

In step S14, the job generation unit 65 generates a print job based on the instruction document image data in such a way that the work execution instruction document 407 is printed on the second print medium 303.

In step S15, the transmission unit 67 transmits the generated print job to the second printing device 201. Thus, the work execution instruction document 407 is printed on the second print medium 303 by the second printing device 201, as shown in FIG. 5.

When the output destination setting unit 63 has set the electronic data file format as the output destination of instruction document image data in step S09, the processing proceeds to step S16.

In step S16, the file generation unit 69 generates an electronic data file of the work execution instruction document 407, based on the instruction document image data.

In this way, by setting an output destination of instruction document image data in the print setting screen 71, the user can select whether to print the work execution instruction document 407 by the first printing device 101, print the work execution instruction document 407 by the second printing device 201, or generate an electronic data file of the work execution instruction document 407 by the file generation unit 69.

As described above, the information processing device 1 according to this embodiment sets the split printing information 47 and this causes not only the split position image 411 but also the overlap area image 413 to be displayed in the instruction document preview 51. Thus, the operation to display the overlap area image 413 in the instruction document preview 51 is reduced and user-friendliness is improved.

Other Modification Examples

The present disclosure is not limited to the above embodiment. Various configurations can be employed without departing from the spirit and scope of the present disclosure. For example, the above embodiment can be changed to the forms described below.

The information processing device 1 is not limited to being configured to be able to add the comment image 421 in the instruction document preview 51, based on an input operation in the instruction document preview 51, and may be configured to automatically display the comment image 421 in the instruction document preview 51, based on the split printing information 47. For example, when the overlap area information included in the split printing information 47 indicates that the paste margin 425 is provided on the lower side of each sub-images 403, the information processing device 1 may display, in the instruction document preview 51, the comment image 421 showing that the plurality of sub-images 403 are to be pasted in order from the top.

The information processing device 1 is not limited to being configured to print the work execution instruction document 407 in the direction of the length of the first print medium 301 in relation to the plurality of sub-images 403, when the first printing device 101 is selected as the output destination of instruction document image data in the confirmation window 55 and it is determined that the work execution instruction document 407 cannot be printed in the margin 429 in the direction of the width of the first print medium 301 in relation to the plurality of sub-images 403. For example, the information processing device 1 may recommend, to the user, the second printing device 201 instead of the first printing device 101 as the output destination of instruction document image data, or may transmit a print job including instruction document image data to the second printing device 201 without asking the user for confirmation. The information processing device 1 may also suspend the printing control processing for the work execution instruction document 407.

The measure to ask the user whether to change the split printing information 47 based on the work execution image 409 after change, when the information processing device 1 has determined that the operation of changing the work execution image 409 in the instruction document preview 51 is the second change, is not limited to displaying the confirmation window 55. For example, the information processing device 1 may output a sound to ask the user for confirmation.

When an operation of changing the work execution image 409 is carried out in the instruction document preview 51, the information processing device 1 changes the split printing information 47, based on the work execution image 409 after the change, as described above. The information processing device 1 is not limited to being configured to display both the split position image 411 and the overlap area image 413 are displayed in the instruction document preview 51, as the work execution image 409. For example, the information processing device 1 may be configured to display the split position image 411 in the instruction document preview 51 but not display the overlap area image 413, and to change the split position information included in the split printing information 47, based on the split position image 411 after movement, when an operation of moving the split position image 411 is carried out in the instruction document preview 51.

Supplementary Notes

Supplementary notes on the information processing device, the control method for the information processing device, and the program are given below.

An information processing device includes: a split printing information setting unit setting split printing information, the split printing information including split position information about a split position in an original image when splitting the original image into a plurality of sub-images and printing the sub-images and overlap area information about an overlap area between the sub-images when pasting together the plurality of sub-images that are printed; and an instruction document preview generation unit generating an instruction document preview based on the split printing information, the instruction document preview being a print preview of a work execution instruction document for pasting together the plurality of sub-images that are printed. The instruction document preview generation unit generates the instruction document preview in such a way that the original image and a work execution image are displayed, the work execution image including a split position image showing the split position in the original image and an overlap area image showing the overlap area.

This configuration enables not only the split position image but also the overlap area image to be displayed in the instruction document preview by setting the split printing information. Therefore, the operation to display the overlap area image is reduced and user-friendliness is improved.

In this case, the instruction document preview generation unit may change the split printing information, based on the work execution image after change, when an operation of changing the work execution image is carried out in the instruction document preview.

This configuration enables the user to change the split printing information by carrying out the operation of changing the work execution image in the instruction document preview.

In this case, the change in the work execution image may include at least one of moving the split position image in the instruction document preview, moving the overlap area image in the instruction document preview, and adding the work execution image in the instruction document preview.

According to this configuration, when the change in the work execution image includes moving the split position image in the instruction document preview and an operation of moving the split position image is carried out, the split position information is changed, based on the split position image after the movement. When the change in the work execution image includes moving the overlap area image in the instruction document preview and an operation of moving the overlap area image is carried out, the overlap area information is changed, based on the overlap area image after the movement. When the change in the work execution image includes adding the work execution image in the instruction document preview and an operation of adding the work execution image is carried out, the split printing information is changed, based on the work execution image after the addition.

In this case, the work execution image added in the instruction document preview may include a comment image showing an order of pasting the plurality of sub-images together.

This configuration enables the user viewing the work execution instruction document to check the order of pasting the plurality of sub-images together.

In this case, the split printing information setting unit may determine whether the operation of changing the work execution image in the instruction document preview is a first change or a second change. When determining that the operation of changing the work execution image in the instruction document preview is the first change, the split printing information setting unit may change the split printing information, based on the work execution image after the change, without asking a user for confirmation. When determining that the operation of changing the work execution image in the instruction document preview is the second change, the split printing information setting unit may ask the user whether or not to change the split printing information, based on the work execution image after the change.

According to this configuration, when determining that the operation of changing the work execution image in the instruction document preview is the first change, the information processing device changes the split printing information, based on the work execution image after the change, without asking the user for confirmation. Therefore, the user can make the split printing information constantly reflect the result of change in the work execution image in the instruction document preview. Meanwhile, when determining that the operation of changing the work execution image in the instruction document preview is the second change, the information processing device asks the user whether or not to change the split printing information, based on the work execution image after the change. Therefore, the user can make the split printing information constantly reflect the result of change in the work execution image in the instruction document preview according to need.

In this case, the information processing device may include a job generation unit generating a print job including instruction document image data corresponding to the instruction document preview, and a transmission unit transmitting the print job to a printing device.

This configuration enables printing of the work execution instruction document including the split position image and the overlap area image.

The first printing device 101 is an example of the "printing device". Similarly, the second printing device 201 is an example of the "printing device".

In this case, the printing device may include a first printing device printing the plurality of sub-images on a first print medium. The job generation unit may generate the print job including a plurality of sub-image data corresponding to the plurality of sub-images and the instruction document image data. The transmission unit may transmit the print job to the first printing device.

This configuration enables printing of the work execution instruction document along with the plurality of sub-images on the first print medium.

In this case, the job generation unit may generate the print job in such a way that the plurality of sub-images and the work execution instruction document arranged in a direction of a width of the first print medium in relation to the plurality of sub-images are printed on the first print medium, when the work execution instruction document can be printed in a margin in the direction of the width of the first print medium in relation to the plurality of sub-images printed on the first print medium.

According to this configuration, when the work execution instruction document can be printed in a margin in the direction of the width of the first print medium in relation to the plurality of sub-images printed on the first print medium, the work execution instruction document is printed in the margin. Thus, increase in the amount of the first print medium consumed is restrained.

In this case, the printing device may include a first printing device printing the plurality of sub-images on a first print medium, and a second printing device that is different from the first printing device. The information processing device may include a file generation unit generating an electronic data file, based on the instruction document image data, and an output destination setting unit setting an output destination of the instruction document image data from among the first printing device, the second printing device, and an electronic data file format, based on a selection by a user. The transmission unit may transmit the print job including the instruction document image data to the first printing device when the first printing device is set as the output destination of the instruction document image data, and may transmit the print job including the instruction document image data to the second printing device when the second printing device is set as the output destination of the instruction document image data. The file generation unit may generate the electronic data file based on the instruction document image data, when the electronic data file format is set as the output destination of the instruction document image data.

This configuration enables the user to select whether to print the work execution instruction document by the first printing device, print the work execution instruction document by the second printing device, or generate an electronic data file of the work execution instruction document in a predetermined electronic data file format.

In this case, the information processing device may include a split setting preview generation unit generating a split setting preview showing how the original image is split.

This configuration enables the user to check how the original image is split by seeing the split setting preview before printing the plurality of sub-images.

A control method for an information processing device includes: setting split printing information including split position information about a split position in an original image when splitting the original image into a plurality of sub-images and printing the sub-images and overlap area information about an overlap area between the sub-images when pasting together the plurality of sub-images that are printed; and generating an instruction document preview based on the split printing information, the instruction document preview being a print preview of a work execution instruction document for pasting together the plurality of sub-images that are printed. The generating the instruction document preview generates the instruction document preview in such a way that the original image and a work execution image are displayed, the work execution image including a split position image showing the split position in the original image and an overlap area image showing the overlap area.

This configuration enables not only the split position image but also the overlap area image to be displayed in the instruction document preview by setting the split printing information. Therefore, the operation to change the split printing information is reduced and user-friendliness is improved.

In a non-transitory computer-readable storage medium storing a program, the program causes a processor provided in an information processing device to execute: setting split printing information including split position information about a split position in an original image when splitting the original image into a plurality of sub-images and printing the sub-images and overlap area information about an overlap area between the sub-images when pasting together the plurality of sub-images that are printed; and generating an instruction document preview based on the split printing information, the instruction document preview being a print preview of a work execution instruction document for pasting together the plurality of sub-images that are printed. The generating the instruction document preview generates the instruction document preview in such a way that the original image and a work execution image are displayed, the work execution image including a split position image showing the split position in the original image and an overlap area image showing the overlap area.

This configuration enables not only the split position image but also the overlap area image to be displayed in the instruction document preview by setting the split printing information. Therefore, the operation to change the split printing information is reduced and user-friendliness is improved.

What is claimed is:

1. An information processing device comprising:
a central processing unit (CPU) configured to:
set split printing information, wherein
the split printing information includes split position information and overlap area information,
the split position information corresponds to information about a split position in an original image when splitting the original image into a plurality of sub-images and printing the sub-images, and
the overlap area information corresponds to information about an overlap area between the sub-images when pasting together the plurality of sub-images that are printed; and
generate an instruction document preview based on the split printing information, wherein
the instruction document preview is a print preview of a work execution instruction document for pasting together the plurality of sub-images that are printed,
the instruction document preview is generated in such a way that the original image and a work execution image are displayed,
the work execution image includes a split position image showing the split position in the original image and an overlap area image showing the overlap area, and
the overlap area corresponds to an area where the plurality of sub-images overlap each other when the plurality of sub-images are pasted together using a paste margin.

2. The information processing device according to claim 1, wherein the CPU is further configured to change the split printing information, based on the work execution image after change, when an operation of changing the work execution image is carried out in the instruction document preview.

3. The information processing device according to claim 2, wherein the change in the work execution image includes at least one of moving the split position image in the instruction document preview, moving the overlap area image in the instruction document preview, or adding the work execution image in the instruction document preview.

4. The information processing device according to claim 3, wherein the work execution image added in the instruction document preview includes a comment image showing an order of pasting the plurality of sub-images together.

5. The information processing device according to claim 2, wherein the CPU is further configured to:
determine whether the operation of changing the work execution image in the instruction document preview is a first change or a second change,
change the split printing information, based on the work execution image after the change of the work execution image, without asking a user for confirmation, when determining that the operation of changing the work execution image in the instruction document preview is the first change, and
ask the user whether or not to change the split printing information, based on the work execution image after the change, when determining that the operation of changing the work execution image in the instruction document preview is the second change.

6. The information processing device according to claim 1, further comprising:
a job generation unit generating a print job including instruction document image data corresponding to the instruction document preview; and
a transmission unit transmitting the print job to a printing device.

7. The information processing device according to claim 6, wherein
the printing device includes a first printing device printing the plurality of sub-images on a first print medium,
the job generation unit generates the print job including a plurality of sub-image data corresponding to the plurality of sub-images and the instruction document image data, and
the transmission unit transmits the print job to the first printing device.

8. The information processing device according to claim 7, wherein the job generation unit generates the print job in such a way that the plurality of sub-images and the work execution instruction document arranged in a direction of a width of the first print medium in relation to the plurality of sub-images are printed on the first print medium, when the work execution instruction document can be printed in a margin in the direction of the width of the first print medium in relation to the plurality of sub-images printed on the first print medium.

9. The information processing device according to claim 6, wherein
the printing device includes a first printing device printing the plurality of sub-images on a first print medium and a second printing device that is different from the first printing device,
the information processing device further comprises
a file generation unit generating an electronic data file, based on the instruction document image data, and
an output destination setting unit setting an output destination of the instruction document image data from among the first printing device, the second printing device, and an electronic data file format, based on a selection by a user, wherein
the transmission unit transmits the print job including the instruction document image data to the first printing device when the first printing device is set as the output destination of the instruction document image data, and transmits the print job including the instruction document image data to the second printing device when the second printing device is set as the output destination of the instruction document image data, and
the file generation unit generates the electronic data file based on the instruction document image data, when the electronic data file format is set as the output destination of the instruction document image data.

10. The information processing device according to claim 1, further comprising a split setting preview generation unit generating a split setting preview showing how the original image is split.

11. A control method for an information processing device, the method comprising:
setting split printing information including split position information and overlap area information, wherein
the split position information corresponds to information about a split position in an original image when splitting the original image into a plurality of sub-images and printing the sub-images, and the overlap area information corresponds to information about an overlap area between the sub-images when pasting together the plurality of sub-images that are printed; and generating an instruction document preview based on the split printing information, wherein the instruction document preview is a print preview of a work execution instruction document for pasting together the plurality of sub-images that are printed, the instruction document preview is generated in such a way that the original image and a work execution image are displayed, the work execution image includes a split position image showing the split position in the original image and an overlap area image showing the overlap area, and the overlap area corresponds to an area where the plurality of sub-images overlap each other when the plurality of sub-images are pasted together using a paste margin.

12. A non-transitory computer-readable storage medium storing a program, the program causing a processor provided in an information processing device to execute:

setting split printing information including split position information and overlap area information, wherein the split position information corresponds to information about a split position in an original image when splitting the original image into a plurality of sub-images and printing the sub-images, and the overlap area information corresponds to information about an overlap area between the sub-images when pasting together the plurality of sub-images that are printed; and generating an instruction document preview based on the split printing information, wherein the instruction document preview is a print preview of a work execution instruction document for pasting together the plurality of sub-images that are printed, the instruction document preview is generated in such a way that the original image and a work execution image are displayed, the work execution image includes a split position image showing the split position in the original image and an overlap area image showing the overlap area, and the overlap area corresponds to an area where the plurality of sub-images overlap each other when the plurality of sub-images are pasted together using a paste margin.

* * * * *